(12) United States Patent
Li et al.

(10) Patent No.: US 10,659,119 B2
(45) Date of Patent: May 19, 2020

(54) METHOD FOR TRANSMITTING A REFERENCE SIGNAL, METHOD FOR DETERMINING PHASE NOISE AND RELATED APPARATUSES

(71) Applicant: China Academy of Telecommunications Technology, Beijing (CN)

(72) Inventors: Hui Li, Beijing (CN); Qiubin Gao, Beijing (CN); Xin Su, Beijing (CN); Tamrakar Rakesh, Beijing (CN); Runhua Chen, Beijing (CN); Qiuping Huang, Beijing (CN); Chuanjun Li, Beijing (CN); Mengjun Wang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/475,072

(22) PCT Filed: Aug. 25, 2017

(86) PCT No.: PCT/CN2017/099106
§ 371 (c)(1),
(2) Date: Jun. 28, 2019

(87) PCT Pub. No.: WO2018/120875
PCT Pub. Date: Jul. 5, 2018

(65) Prior Publication Data
US 2019/0326964 A1    Oct. 24, 2019

(30) Foreign Application Priority Data
Dec. 28, 2016 (CN) .......................... 2016 1 1239760

(51) Int. Cl.
H04L 27/26 (2006.01)
H04B 7/0456 (2017.01)
H04L 25/02 (2006.01)

(52) U.S. Cl.
CPC ....... *H04B 7/0478* (2013.01); *H04L 25/0204* (2013.01); *H04L 27/2602* (2013.01); *H04L 27/2649* (2013.01)

(58) Field of Classification Search
CPC ... H04B 7/02; H04B 7/04; H04B 7/06; H04B 7/26; H04B 7/0413; H04B 7/0456;
(Continued)

(56) References Cited

U.S. PATENT DOCUMENTS

2008/0101497 A1    5/2008  Gaikwad et al.
2012/0106373 A1*   5/2012  Gaal ................ H04L 25/03343
                                                370/252
(Continued)

FOREIGN PATENT DOCUMENTS

CN     103139115 A    6/2013
CN     103250357 A    8/2013
(Continued)

OTHER PUBLICATIONS

Catt, "Consideration on UL DMRS enhancements," 3GPP TSG RAN WG1 Meeting #86bis, Oct. 10-14, 2016, 2 pages, R1-1608729, Lisbon, Portugal.
(Continued)

*Primary Examiner* — Shawkat M Ali
(74) *Attorney, Agent, or Firm* — Womble Bond Dickinson (US) LLP

(57) ABSTRACT

The present invention relates to the field of wireless communications, and in particular, to a method for transmitting a reference signal, a method for determining a phase noise, and related apparatuses, to resolve the problem in the prior
(Continued)

art that different phase noises of different antenna units or antenna ports of a transmitter cannot be accurately estimated and compensated for. The method comprises: the transmitter respectively transmitting each precoded DMRS and PTRS to a receiver via respective corresponding antenna groups having a same phase noise, and when the receiver receives the PTRS, performing channel estimation based on each received PTRS, to determine phase changes caused by phase noises corresponding to different antenna groups. In this way, even if different antennas of a transmitter have different phase noises, phase changes caused by the different phase noises can still be accurately determined, so that all data transmitted by the different antenna groups can be accurately demodulated according to different phase changes.

14 Claims, 8 Drawing Sheets

(58) Field of Classification Search
CPC .......... H04B 7/0478; H04J 11/00; H04L 1/02; H04L 5/00; H04L 5/0051; H04L 25/02; H04L 25/0048; H04L 25/0204; H04L 25/0224; H04L 27/26; H04L 27/2602; H04L 27/2649; H04W 16/00; H04W 72/14; H04W 88/02
USPC ........ 370/252, 328, 329; 375/219, 232, 260, 375/262, 267, 295, 316
See application file for complete search history.

(56) References Cited

U.S. PATENT DOCUMENTS

| | | | |
|---|---|---|---|
| 2013/0107746 A1* | 5/2013 | Wang | H04L 5/0023 370/252 |
| 2014/0050259 A1 | 2/2014 | Azizi et al. | |
| 2014/0064391 A1* | 3/2014 | Cheng | H04B 7/024 375/267 |
| 2017/0302352 A1* | 10/2017 | Islam | H04B 7/0626 |
| 2017/0302495 A1* | 10/2017 | Islam | H04L 5/0048 |
| 2018/0041259 A1* | 2/2018 | Kim | H04B 7/0456 |
| 2018/0077603 A1* | 3/2018 | John Wilson | H04W 72/0406 |
| 2018/0167237 A1* | 6/2018 | Gudovskiy | H04L 5/0048 |
| 2019/0097776 A1* | 3/2019 | Kim | H04W 72/042 |
| 2019/0222385 A1* | 7/2019 | Hessler | H04L 1/0005 |

FOREIGN PATENT DOCUMENTS

| | | |
|---|---|---|
| EP | 2584810 A1 | 4/2013 |
| EP | 2768190 A3 | 10/2014 |
| EP | 2899899 A1 | 7/2015 |
| WO | 2014113938 A1 | 7/2014 |
| WO | 2014113971 A1 | 7/2014 |
| WO | 2018121671 A1 | 7/2018 |

OTHER PUBLICATIONS

The First Official Chinese Office Action for Application No. 201611239760.3 dated Aug. 28, 2019, 5 pages.
Huawei, "Reference signal design for phase noise compensation in HF," 3GPP TSG RAN WG1 Meeting #86bis, Oct. 10-14, 2016, 5 pages, R1-1608822, Lisbon, Portugal.
Catt, "Consideration on UL DRMS enhancements," 3GPP TSG RAN WG1 Meeting #86bis,Oct. 10-14, 2016, 7.2.2.3, R1-1608729, Lisbon, Portugal, 2 pages.
Huawei et al., "Reference signal design for phase noise compensation in HF," 3GPP TSG RAN WG1 Meeting #86bis, Oct. 10-14, 2016, 8.1.4.4, R1-1608822, Lisbon, Portugal, 5 pages.
Jabran, B. et al., "Phase Noise Estimation and Compensation for OFDM Systems: a DCT-Based Approach," ISSTA 2010, Oct. 20, 2010, 5 pages.
Plant, D.V. et al., "Improvement of Phase Noise Compensation for Coherent Optical OFDM via Data-Aided Phase Equalizer," NFOEC 2010, Dec. 31, 2010, 3 pages.
The First Office Action of related Taiwanese Patent Application No. 10721048590, dated Nov. 12, 2018, 11 pages.
The International Search Report and Written Opinion of PCT Application No. PCT/CN2017/099106, dated Nov. 29, 2017, with english translation, 14 pages.
The International Search Report and Written Opinion of PCT Application No. PCT/CN2017/099106, dated Nov. 29, 2017, with english translation from WIPO, 14 pages.
Catt, "Discussion on phase tracking RS for NR," 3GPP TSG RAN WG1 Meeting #87, Nov. 14-18, 2016, 3 pages, R1-1611382, Reno, USA.
The Extended European Search Report for European Application No. 17888540.6 dated Nov. 18, 2019, 12 pages.
LG Electronics, "Discussion on Phase Tracking RS for Multi-Antenna," 3GPP TSG RAN WG1 Meeting #87, Nov. 14-18, 2016, 6 pages, R1-1611811, Reno, USA.
Qualcomm Incorporated, "Phase and Frequency Tracking Reference Signal Considerations," 3GPP TSG-RAN WG1 #87, Nov. 14-18, 2016, 4 pages, R1-1612054, Reno, USA.

* cited by examiner

METHOD FOR TRANSMITTING A REFERENCE SIGNAL, METHOD FOR DETERMINING PHASE NOISE AND RELATED APPARATUSES

CROSS REFERENCE TO RELATED APPLICATIONS

This patent application is a U.S. National Stage of International Application No. PCT/CN2017/099106, filed Aug. 25, 2017, which claims priority to Chinese Patent Application No. 201611239760.3, filed with the Chinese Patent Office on Dec. 28, 2016, and entitled "Method and apparatus for transmitting reference signal, and method and apparatus for determining phase noise", which was incorporated by reference in its entirety.

FIELD

The present invention relates to the field of wireless communications, and particularly to a method and apparatus for transmitting a reference signal, and a method and apparatus for determining phase noise.

BACKGROUND

Phase noise is a major noise that causes interference to a communication system in wireless communication, the phase noise comes from oscillators in a transmitter and a receiver of the communication system, and may seriously affect transmission of a multi-carrier signal, so in order to reduce the influence of phase noise on the multi-carrier signal transmission, phase noise compensation can be performed on a received signal at the receiver to thereby guarantee accuracy of transmission.

In the prior art, a phase-tracking reference signal is introduced at the transmitter, which tracks a phase change arising from phase noise using the phase-tracking reference signal, and then the receiver performs phase noise compensation on the received signal according to the phase change.

Specifically a multi-carrier signal transmission can include the uplink transmission and downlink transmission, and when in the downlink transmission, as illustrated in FIG. 1a, 61 and 60 at the top-right corner represent different port serial numbers, where ports of a phase-tracking reference signal occupy a sub-carrier, and each phase-tracking reference signal is transmitted consecutively in a sub-frame; and the transmitter (e.g., a base station) can notify via dynamic downlink signaling the receiver (e.g., a user equipment) of the number of ports for the currently transmitted phase-tracking reference signal, e.g., two ports for transmitting the phase-tracking reference signal, or one port for transmitting the phase-tracking reference signal.

Specifically when in the uplink transmission, as illustrated in FIG. 1b, P=40 to 43 at the top-right corner represent port serial numbers, where ports of a phase-tracking reference signal occupy a sub-carrier, and each phase-tracking reference signal is transmitted inconsecutively in a sub-frame; and the receiver (e.g., a user equipment) can notify via dynamic downlink signaling the transmitter (e.g., a base station) of the number of ports for the currently transmitted phase-tracking reference signal, e.g., four ports for transmitting the phase-tracking reference signal, or two ports for transmitting the phase-tracking reference signal.

Furthermore a phase-tracking reference signal is used when the transmitter transmits user data to the receiver, and can be transmitted only after being pre-coded.

In the solution above, the phase-tracking reference signal passes through the same channel as the user data and a corresponding Demodulation Reference Signal (DMRS). The phase-tracking reference signal is used for calculating a phase difference between channel estimation on a symbol including the phase-tracking reference signal, and channel estimation on a symbol including the DMRS, to thereby determine a phase change arising from phase noise for channel estimation compensation and data demodulation.

In a multi-antenna transmitting and receiving system, a transmitter includes a plurality of antenna elements or antenna ports. If these antenna elements or antenna ports have same phase noise (phase noise from the same phase noise source), then phase noise may be estimated and compensated correctly in the solution above. However if the antenna elements or the antenna ports in the transmitter have different phase noises, then there may be a plurality of phase changes over channels through which user data pass, and the different phase changes arising from the respective phase noises cannot be estimated in the solution above, so that channel estimation compensation and data demodulation cannot be performed correctly.

In view of this, it is desirable to devise a method for transmitting a reference signal, and a method for determining phase noise so as to address the drawback above.

SUMMARY

Embodiments of the invention provide a method and apparatus for transmitting a reference signal, and a method and apparatus for determining phase noise, so as to address the problem in the prior art that different phase noises of different antenna elements or antenna ports of a transmitter cannot be estimated and compensated accurately.

Technical solutions according to the embodiments of the invention are as follows.

In a first aspect, an embodiment of the invention provides a method for transmitting a reference signal, the method including:

pre-coding, by a transmitter, each data stream, and transmitting each data stream over its corresponding one or more antenna groups, wherein antenna elements or antenna ports in the same antenna group have a same phase noise, and all antenna groups corresponding to one data stream have a same phase noise;

pre-coding, by the transmitter, a Demodulation Reference Signal (DMRS) of each DMRS port, and transmitting each DMRS over its corresponding one or more antenna groups, wherein all antenna groups corresponding to one DMRS port have a same phase noise, and one data stream corresponds to one DMRS port; and pre-coding, by the transmitter, a Phase-Tracking Reference Signal (PTRS) of each PTRS port, and transmitting each PTRS over its corresponding one or more antenna groups, wherein all antenna groups corresponding to one PTRS port have a same phase noise, and one PTRS port corresponds to at least one DMRS port.

Optionally the transmitter pre-codes a data stream in such a way that weights for antenna elements or antenna ports in the other antenna groups than an antenna group corresponding to the data stream are zero;

the transmitter pre-codes a DMRS in such a way that weights for antenna elements or antenna ports in the other antenna groups than an antenna group corresponding to the DMRS are zero; and the transmitter pre-codes a PTRS in such a way that weights for antenna elements or antenna ports in the other antenna groups than an antenna group corresponding to the PTRS are zero.

Optionally the method further includes:

determining, by the transmitter, a first mapping relationship between the respective PTRS ports and the respective DMRS ports, wherein in the first mapping relationship, one PTRS port is mapped to at least one DMRS port, and the PTRS port and its mapped DMRS port use a same antenna group for transmission.

Optionally the method further includes:

transmitting, by the transmitter, the first mapping relationship to a receiver after determining the first mapping relationship; or pre-agreeing, by the transmitter, with a receiver on the first mapping relationship.

Optionally transmitting, by the transmitter, the first mapping relationship to the receiver includes:

transmitting, by the transmitter, the first mapping relationship to the receiver via higher-layer signaling; or transmitting, by the transmitter, the first mapping relationship to the receiver via dynamic control signaling.

Optionally the method further includes:

determining, by the transmitter, a second mapping relationship between the respective data streams to be transmitted and the respective DMRS ports, wherein in the second mapping relationship, one data stream is mapped to one DMRS port, and the data stream and its mapped DMRS port correspond to a same antenna group for transmission.

Optionally the method further includes:

transmitting, by the transmitter, the second mapping relationship to a receiver after determining the second mapping relationship; or pre-agreeing, by the transmitter, with a receiver on the second mapping relationship.

Optionally transmitting, by the transmitter, the second mapping relationship to the receiver includes:

transmitting, by the transmitter, the second mapping relationship to the receiver via higher-layer signaling; or transmitting, by the transmitter, the second mapping relationship to the receiver via dynamic control signaling.

Optionally precoder used by the transmitter for a PTRS is the same as or related to precoder used by a data stream over a sub-carrier occupied by the PTRS, the data stream corresponds to a DMRS port corresponding to the PTRS.

Optionally precoder used by the transmitter for a DMRS is the same as or related to precoder used by a data stream over a sub-carrier occupied by the DMRS port, said data stream corresponds to the DMRS port.

In a second aspect, an embodiment of the invention provides a method for determining phase noise, the method including:

receiving, by a receiver, a Demodulation Reference Signals (DMRS) transmitted by a transmitter respectively over one or more antenna groups corresponding to each DMRS port, performing first channel estimation respectively based upon each received DMRS, and obtaining a corresponding first channel estimation result corresponding to each DMRS;

receiving, by the receiver, a Phase-Tracking Reference Signal (PTRS) transmitted by the transmitter respectively over one or more antenna groups corresponding to each PTRS port, performing second channel estimation respectively based upon each received PTRS, and obtaining a corresponding second channel estimation result corresponding to each PTRS;

determining, by the receiver, a first mapping relationship, wherein the first mapping relationship represents a correspondence relationship between the respective PTRS ports and the respective DMRS ports, one PTRS port corresponds to at least one DMRS port, and the PTRS port and its corresponding DMRS port uses a same antenna port group for transmission; and calculating, by the receiver, a phase change, in a symbol including the PTRS, arising from a phase noise of the antenna groups corresponding to each PTRS port respectively using the second channel estimation result of each PTRS and the first channel estimation result of corresponding DMRS based upon the first mapping relationship.

Optionally the first mapping relationship is obtained by the receiver as notified by the transmitter, or the first mapping relationship is pre-agreed between the receiver and the transmitter.

Optionally the method further includes:

receiving, by the receiver, respective data streams transmitted by the transmitter respectively over their corresponding antenna groups;

determining, by the receiver, a second mapping relationship, wherein the second mapping relationship represents a correspondence relationship between the respective data streams and the respective DMRS ports, one data stream corresponds to one DMRS port, and the data stream and its corresponding DMRS port correspond to a same antenna group for transmission; and performing, by the receiver, following operations respectively on each data stream based upon the second mapping relationship:

determining a first channel estimation result estimated on a DMRS port corresponding to the data stream;

compensating for the first channel estimation result using a phase change arising from phase noise of an antenna group corresponding to the DMRS port; and demodulating the data stream using the compensated first channel estimation result.

Optionally the second mapping relationship is obtained by the receiver as notified by the transmitter, or the second mapping relationship is pre-agreed between the receiver and the transmitter.

In a third aspect, an embodiment of the invention provides an apparatus for transmitting a reference signal, the apparatus including:

a first transmitting unit configured to pre-code each data stream, and transmit each data stream over its corresponding one or more antenna groups, wherein antenna elements or antenna ports in a same antenna group have a same phase noise, and all antenna groups corresponding to one data stream have a same phase noise;

a second transmitting unit configured to pre-code a Demodulation Reference Signal (DMRS) of each DMRS port, and transmit each DMRS over its corresponding one or more antenna groups, wherein all antenna groups corresponding to one DMRS port have a same phase noise, and one data stream corresponds to one DMRS port; and a third transmitting unit configured to pre-code a Phase-Tracking Reference Signal (PTRS) of each PTRS port, and transmit each PTRS over its corresponding one or more antenna groups, wherein all antenna groups corresponding to one PTRS port have a same phase noise, and one PTRS port corresponds to at least one DMRS port.

Optionally the apparatus further includes a pre-coding unit configured:

to pre-code a data stream in such a way that weights for antenna elements or antenna ports in the other antenna groups than an antenna group corresponding to the data stream are zero;

to pre-code a DMRS in such a way that weights for antenna elements or antenna ports in the other antenna groups than an antenna group corresponding to the DMRS are zero; and to pre-code a PTRS in such a way that weights for antenna elements or antenna ports in the other antenna groups than an antenna group corresponding to the PTRS are zero.

Optionally the apparatus further includes a first processing unit configured:

to determine a first mapping relationship between the respective PTRS ports and the respective DMRS ports, wherein in the first mapping relationship, one PTRS port is mapped to at least one DMRS port, and the PTRS port and its mapped DMRS port use a same antenna group for transmission.

Optionally the first processing unit is further configured:

to transmit the first mapping relationships to a receiver after determining the first mapping relationship; or to pre-agree with a receiver on the first mapping relationship.

Optionally the first processing unit configured to transmit the first mapping relationship to the receiver is configured:

to transmit the first mapping relationship to the receiver via higher-layer signaling; or to transmit the first mapping relationship to the receiver via dynamic control signaling.

Optionally the apparatus further includes a second processing unit configured:

to determine a second mapping relationship between the respective data streams to be transmitted and the respective DMRS ports, wherein in the second mapping relationship, one data stream is mapped to one DMRS port, and the data stream and its mapped DMRS port correspond to a same antenna group for transmission.

Optionally the second processing unit is configured:

to transmit the second mapping relationship to a receiver after determining the second mapping relationship; or to pre-agree with a receiver on the second mapping relationship.

Optionally the second processing unit configured to transmit the second mapping relationship to the receiver is configured:

to transmit the second mapping relationship to the receiver via higher-layer signaling; or to transmit the second mapping relationship to the receiver via dynamic control signaling.

Optionally precoder used by the apparatus for a PTRS is the same as or related to precoder used by a data stream over a sub-carrier occupied by the PTRS, the data stream corresponds to a DMRS port corresponding to the PTRS.

Optionally precoder used by the apparatus for a DMRS is the same as or related to precoder used by a data stream over a sub-carrier occupied by the DMRS port, the data stream corresponds to the DMRS port.

In a fourth aspect, an embodiment of the invention provides an apparatus for determining phase noise, the apparatus including:

a first processing unit configured to receive a Demodulation Reference Signal (DMRS) transmitted by a transmitter over one or more antenna groups corresponding to each DMRS port, to perform first channel estimation respectively based upon each received DMRS, and to obtain a first channel estimation result corresponding to each DMRS;

a second processing unit configured to receive a Phase-Tracking Reference Signal (PTRS) transmitted by the transmitter respectively over one or more antenna groups corresponding to each PTRS port, to perform second channel estimation respectively based upon each received PTRS, and to obtain a second channel estimation result corresponding to each PTRS;

a third processing unit configured to determine a first mapping relationship, wherein the first mapping relationship represents a correspondence relationship between the respective PTRS ports and the respective DMRS ports, one PTRS port corresponds to at least one DMRS port, and the PTRS port and its corresponding DMRS port use a same antenna group for transmission; and a fourth processing unit configured to calculate a phase change, in a symbol including the PTRS, arising from a phase noise of the antenna groups corresponding to each PTRS port respectively using the second channel estimation result of each PTRS and the first channel estimation result of the corresponding DMRS based upon the first mapping relationship.

Optionally the first mapping relationship is obtained by the apparatus as notified by the transmitter, or the first mapping relationship is pre-agreed between the apparatus and the transmitter.

Optionally the apparatus further includes a fifth processing unit configured:

to receive respective data streams transmitted by the transmitter respectively over their corresponding antenna groups;

to determine a second mapping relationship, wherein the second mapping relationship represents a correspondence relationship between the respective data streams and the respective DMRS ports, one data stream corresponds to one DMRS port, and the data stream and its corresponding DMRS port correspond to a same antenna group for transmission; and to perform following operations respectively on each data stream based upon the second mapping relationship:

determining a first channel estimation result estimated on a DMRS port corresponding to the data stream;

compensating for the first channel estimation result using a phase change arising from phase noise of an antenna group corresponding to the DMRS port; and demodulating the data stream using the compensated first channel estimation result.

Optionally the second mapping relationship is obtained by the processor as notified by the transmitter, or the second mapping relationship is pre-agreed between the processors and the transmitter.

In a fifth aspect, an embodiment of the invention provides an apparatus including a processor, a transceiver, and a memory, wherein the processor is configured to read and execute program in the memory to perform the method according to any one of the solutions in the first aspect.

In a sixth aspect, an embodiment of the invention provides an apparatus including a processor, a transceiver, and a memory, wherein the processor is configured to read and execute program in the memory to perform the method according to any one of the solutions in the second aspect.

In a seventh aspect, an embodiment of the invention provides a computer storage medium storing computer executable instructions configured to cause the computer to perform the method according to any one of the solutions in the first aspect.

In an eighth aspect, an embodiment of the invention provides a computer storage medium storing computer executable instructions configured to cause the computer to perform the method according to any one of the solutions in the second aspect.

In the embodiments of the invention, the transmitter transmits respective pre-coded user data streams respectively over their corresponding antenna groups with the same phase noise to the receiver, transmits respective pre-coded DMRSs respectively over their corresponding antenna groups with the same phase noise to the receiver, and transmits respective pre-coded PTRSs respectively over their corresponding antenna groups with the same phase noise to the receiver, where there is the same phase noise for antenna elements or antenna port elements or antenna ports in the same antenna group. Upon reception of the PTRSs, the receiver performs channel estimation based upon the respective received PTRSs, and determines phase changes arising from phase noise corresponding to the different antenna groups, so that even if there is different phase noise of the different antennas of the transmitter, then the receiver will determine the phase changes arising from the different phase noise accurately to thereby compensate for channel estimation results of the DMRS's corresponding to the PTRS's according to the different phase changes, and demodulate all the data transmitted over the different antenna groups accurately according to the different phase changes.

DETAILED DESCRIPTION

In order to address the problem in the prior art that different phase noises of different antenna elements or antenna ports of a transmitter cannot be estimated and compensated for accurately, a solution to transmitting a reference signal and determining phase noise is devised in the embodiments of the invention. In the solution, a transmitter transmits each pre-coded user data stream to a receiver through its corresponding antenna groups with the same phase noise, transmits each pre-coded DMRS to the receiver through its corresponding antenna groups with the same phase noise, and transmits each pre-coded PTRS to the receiver through its corresponding antenna groups with the same phase noise, where antenna elements or antenna port elements or antenna ports in the same antenna group have the same phase noise. Upon reception of the PTRSs, the receiver performs channel estimation based upon each received PTRS, and determines phase changes arising from noise phases corresponding to the different antenna groups.

Preferable embodiments of the invention will be described below in details with reference to the drawings.

Figure 1A:
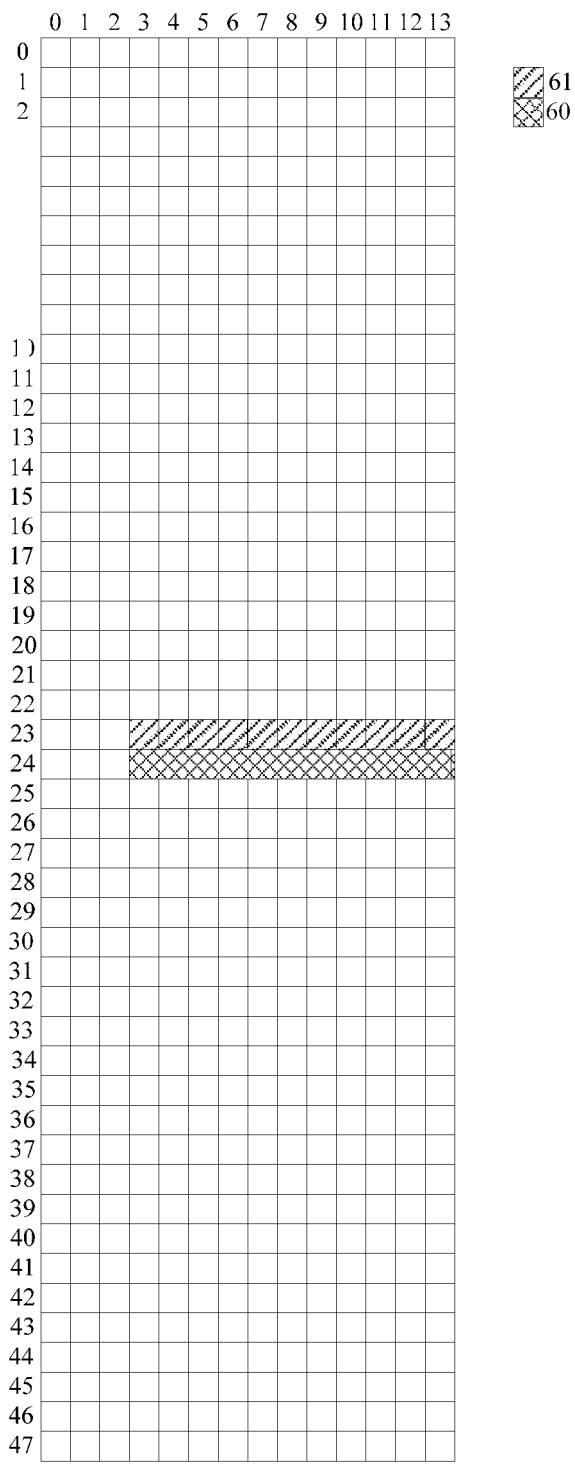
FIG. 1a illustrates time-frequency positions of phase-tracking reference signals in downlink transmission.
Figure 1B:
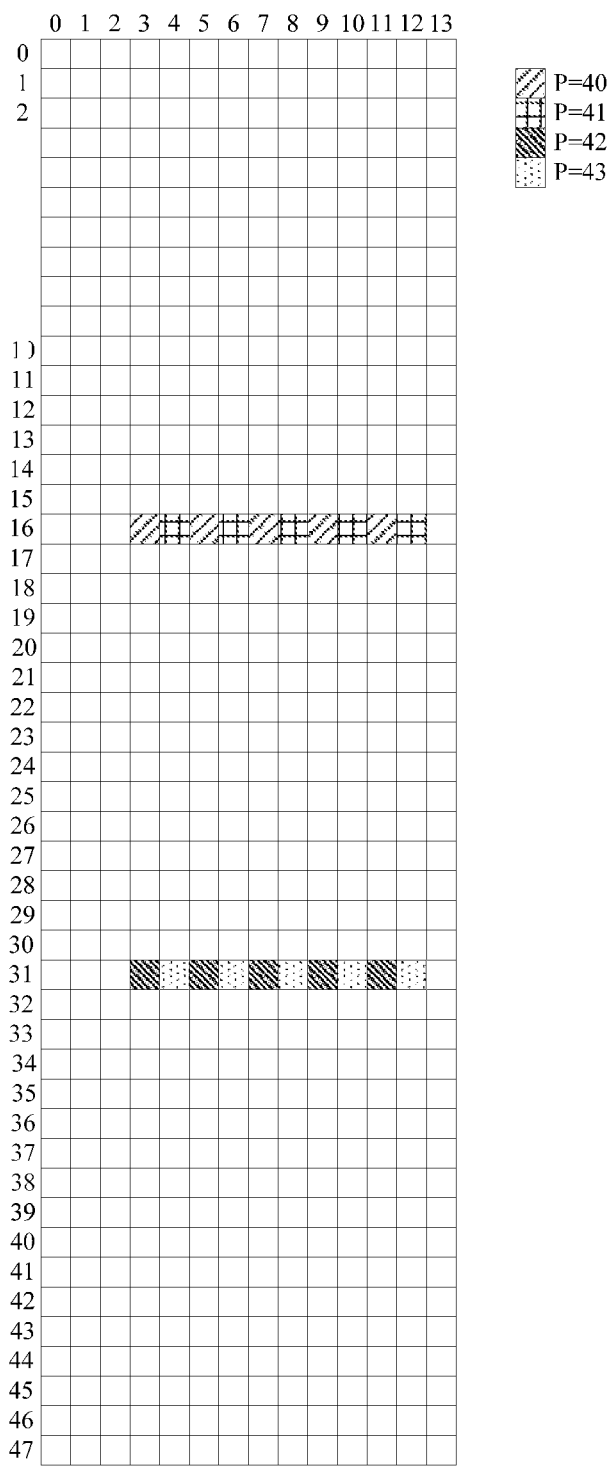
FIG. 1b illustrates time-frequency positions of phase-tracking reference signals in uplink transmission.
Figure 2A:
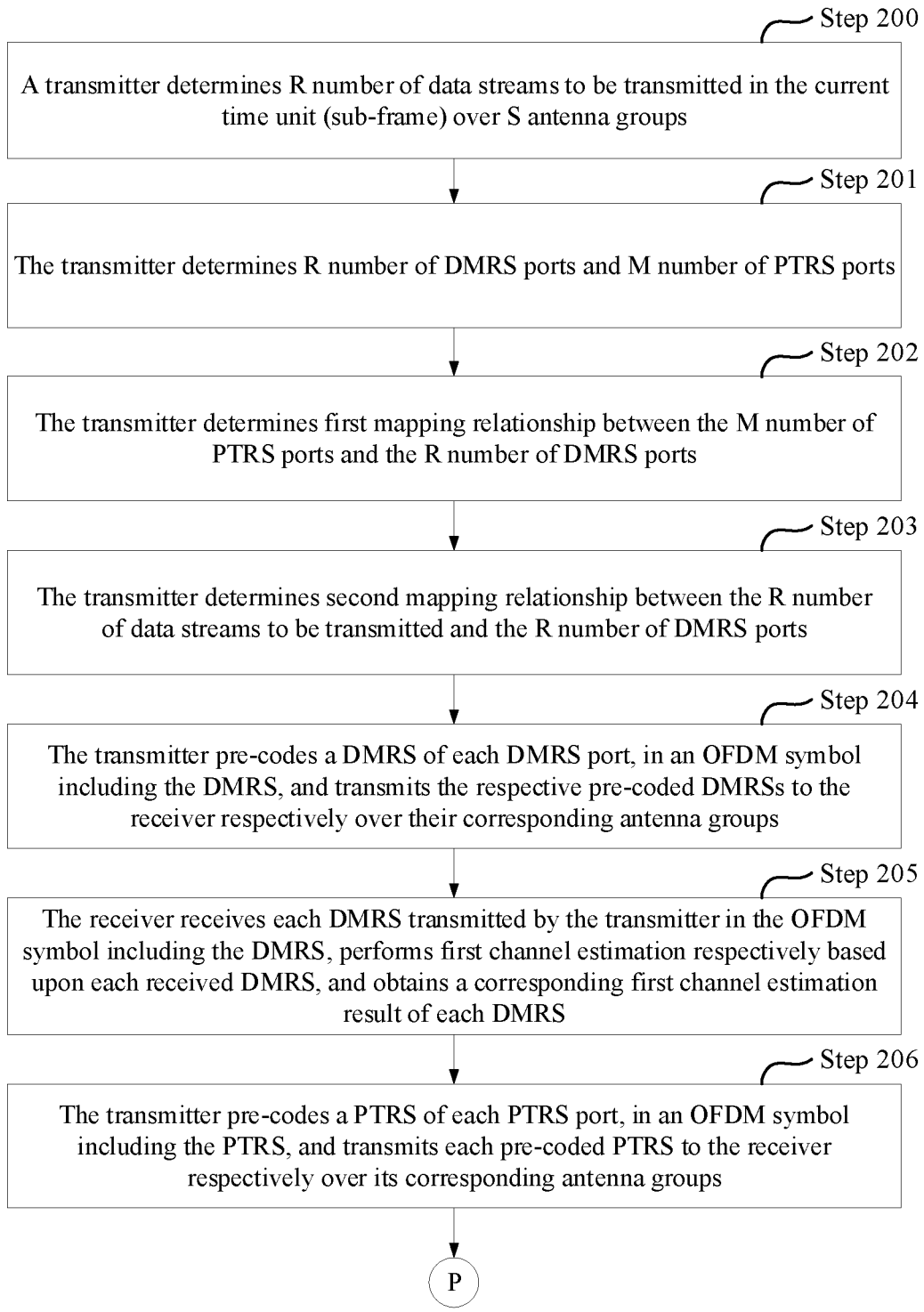
FIG. 2a illustrates a flow chart a of a method for transmitting a reference signal and a method for determining phase noise according to an embodiment of the invention.
Figure 2B:
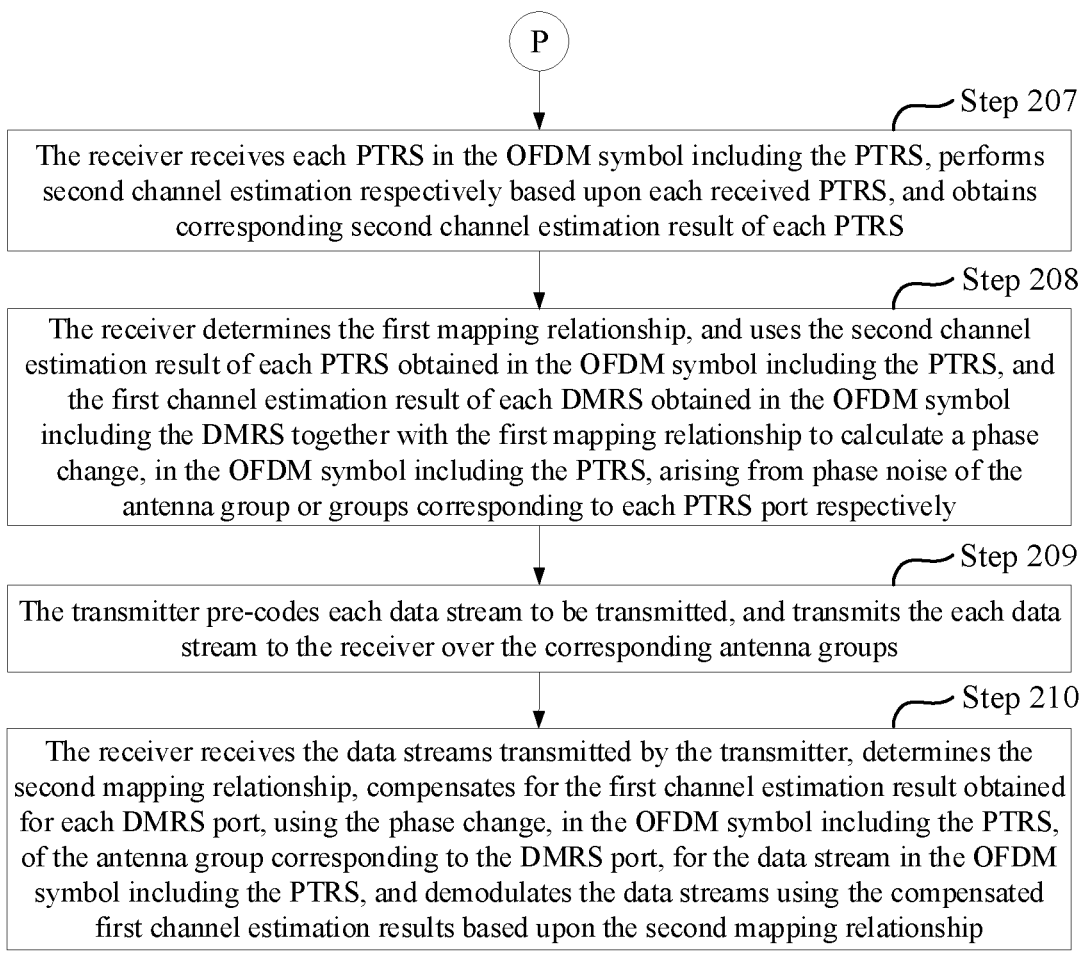
FIG. 2b illustrates a flow chart b of a method for transmitting a reference signal and a method for determining phase noise according to an embodiment of the invention.

As illustrated in FIG. 2a and FIG. 2b, a detailed flow of a method for determining phase noise according to an embodiment of the invention is as follows.

In the step 200, a transmitter determines R number of data streams to be transmitted in the current time unit (sub-frame), which are to be transmitted on S number of antenna groups.

Specifically there is different phase noise for different antennas including different crystal oscillators, so the antennas are grouped into S number of groups according to their phase noise, where the antennas in the same antenna group have the same phase noise.

For example, an antenna group 1 includes two antennas, which are an antenna 1 and an antenna 2 respectively, and an antenna group 2 includes two antennas, which are an antenna 3 and an antenna 4 respectively, so the antenna 1 and the antenna 2 have the same phase noise, and the antenna 3 and the antenna 4 have the same phase noise.

Furthermore each data stream may correspond to one antenna group, or correspond to multiple antenna groups, where all the antenna groups corresponding to one data stream have the same phase noise.

For example, there are two data streams, which are a data stream 1 and a data stream 2 respectively, and there are three antenna groups, which are an antenna group 1, an antenna group 2, and an antenna group 3 respectively, for example, the data stream 1 corresponds to the antenna group 3, and the data stream 2 corresponds to the antenna group 1 and the antenna group 2, so the antenna group 1 and the antenna group 2 have the same phase noise.

In the step 201, the transmitter determines R number of Demodulation Reference Signal (DMRS) ports and M number of Phase-Tracking Reference Signal (PTRS) ports.

Specifically the transmitter determines the R number of DMRS ports, where each DMRS port may correspond to one antenna group, or correspond to multiple antenna groups, and all the antenna groups corresponding to one DMRS port have the same phase noise.

For example, R=2, and S=3, where the DMRS port 1 corresponds to the antenna group 1, and the DMRS port 2 corresponds to the antenna group 2 and the antenna group 3, where the antenna group 2 and the antenna group 3 have the same phase noise.

Specifically the transmitter determines M number of PTRS ports, where each PTRS port may correspond to one antenna group, or correspond to multiple antenna groups, and all the antenna groups corresponding to one PTRS port have the same phase noise.

For example, M=2, and S=3, where the PTRS port 1 corresponds to the antenna group 1, and the PTRS port 2 corresponds to the antenna group 2 and the antenna group 3, where the antenna group 2 and the antenna group 3 have the same phase noise.

In the step 202, the transmitter determines a first mapping relationship between the M number of PTRS ports and the R number of DMRS ports.

Specifically the transmitter determines a correspondence relationship between each PTRS port and each DMRS port based upon the determined M number of PTRS ports and the determined R number of DMRS ports, where one PTRS port corresponds to at least one DMRS port, and the PTRS port and its corresponding DMRS port(s) use the same antenna group for transmission.

For example, M=2, and R=5, that is, there are two PTRS ports, which are a PTRS port 1 and a PTRS port 2 respectively, and there are five DMRS ports, which are a DMRS port 1, a DMRS port 2, a DMRS port 3, a DMRS port 4, and a DMRS port 5 respectively. If the DMRS port 1 and the DMRS port 2 correspond to the PTRS port 1, and the DMRS port 3, the DMRS port 4, and the DMRS port 5 correspond to the PTRS port 2, then there is a first mapping relationship between the PTRS port 1, and the DMRS port 1 and the DMRS port 2, and a first mapping relationship between the PTRS port 2, and the DMRS port 3, the DMRS port 4, and the DMRS port 5; if the antenna group 1 is used for transmission on the PTRS port 1, so the antenna group 1 is also used for transmission on the DMRS port 1 and the DMRS port 2; and for example, the antenna group 2 is used for transmission on the PTRS port 2, so the antenna group 2 is also used for transmission on the DMRS port 2, the DMRS port 4, and the DMRS port 5.

Furthermore the first mapping relationship above can be pre-agreed between the transmitter and the receiver, or can be allocated by the transmitter, and if it is allocated by the transmitter, then the transmitter further needs to transmit the first mapping relationship to the receiver via higher-layer signaling or dynamic control signaling.

In the step 203, the transmitter determines a second mapping relationship between the R number of data streams to be transmitted, and the R number of DMRS ports.

Specifically the transmitter determines the second mapping relationships based upon the determined R number of data streams and R number of DMRS ports, where one data stream corresponds to one DMRS port in the second mapping relationship, and the data stream and the DMRS port corresponding thereto corresponds to the same antenna group for transmission.

For example, R=3, that is, there are three data streams and three DMRS ports, and if the data stream 1 corresponds to the DMRS port 1, the data stream 2 corresponds to the DMRS port 2, and the data stream 3 corresponds to the DMRS port 3, then there is a second mapping relationship between the data stream 1 and the DMRS port 1, a second mapping relationship between the data stream 2 and the DMRS port 2, and a second mapping relationship between the data stream 3 and the DMRS port 3; and if the DMRS port 1 corresponds to the antenna group 1, the DMRS port 2 corresponds to the antenna group 2, and the DMRS port 3 corresponds to the antenna group 3, so the data stream 1 corresponds to the antenna group 1, the data stream 2 corresponds to the antenna group 2, and the data stream 3 corresponds to the antenna group 3.

Furthermore the second mapping relationship above can be pre-agreed between the transmitter and the receiver, or can be allocated by the transmitter, and if it is allocated by the transmitter, then the transmitter further needs to transmit the second mapping relationship to the receiver via higher-layer signaling or dynamic control signaling.

In the step 204, the transmitter pre-codes a DMRS of each DMRS port, in an OFDM symbol including the DMRS, and transmits each pre-coded DMRS to the receiver over its corresponding antenna group.

Specifically the transmitter pre-codes a DMRS of each DMRS port, in an OFDM symbol including the DMRS, where the transmitter pre-codes a DMRS in such a way that weights for antenna elements or antenna ports in the other antenna groups than an antenna group corresponding to the DMRS are zero.

Furthermore precoder used by the transmitter for a DMRS of a DMRS port is the same as precoder used by a data stream over a sub-carrier occupied by the DMRS port, the data stream corresponds to the DMRS port.

Still furthermore the transmitter transmits each pre-coded DMRS to the receiver over one or more antenna groups corresponding thereto after pre-coding the DMRS of each DMRS port.

For example, there are two DMRS ports and three antenna groups, where the DMRS port 1 corresponds to the antenna group 1, and the DMRS port 2 corresponds to the antenna group 2 and the antenna group 3, so the transmitter can transmit DMRS1 to the receiver over the antenna group 1 corresponding to the DMRS port 1, and transmit DMRS2 to the receiver over the antenna group 2 and the antenna group 3 corresponding to the DMRS port 2.

In the step 205, the receiver receives each DMRS transmitted by the transmitter in the OFDM symbol including the DMRS, performs first channel estimation respectively based upon each received DMRS, and obtains a corresponding first channel estimation result of each DMRS.

Specifically the receiver receives each DMRS transmitted by the transmitter in the OFDM symbol including the DMRS over one or more antenna groups corresponding to each DMRS port, performs first channel estimation respectively based upon each received DMRS, and obtains the first channel estimation result corresponding to each DMRS.

In the example of the previous step above again, the receiver receives two DMRSs, which are DMRS1 and DMRS2 respectively, and the receiver performs first channel estimation respectively on DMRS1 and DMRS2, and obtains a first channel estimation result 1 of DMRS1, and a first channel estimation result 2 of DMRS2.

In the step 206, the transmitter pre-codes a PTRS of each PTRS port, in an OFDM symbol including the PTRS, and transmits each pre-coded PTRS to the receiver respectively over its corresponding antenna groups.

Specifically the transmitter pre-codes a PTRS of each PTRS port, in an OFDM symbol including the PTRS, where the transmitter pre-codes a PTRS in such a way that weights for antenna elements or antenna ports in the other antenna groups than an antenna group corresponding to the PTRS are zero.

Furthermore precoder used by the transmitter for a PTRS is the same as or related to precoder used by a data stream over a sub-carrier occupied by the PTRS, the data stream corresponds to a DMRS port corresponding to the PTRS. If the PTRS port corresponds to one DMRS port, then precoder used for the PTRS of the PTRS port is the same as precoder used by a data stream corresponding to the DMRS port corresponding to the PTRS port, over the sub-carrier occupied the PTRS; and if the PTRS port corresponds to more than one DMRS ports, then precoder used for the PTRS of the PTRS port is a result of performing an operation on respective precoders used by data streams corresponding to the DMRS ports corresponding to the PTRS port, over the sub-carrier occupied by the PTRS.

Still furthermore the transmitter transmits the respective pre-coded PTRSs to the receiver over their corresponding one or more antenna groups after pre-coding the PTRS of each PTRS port.

For example, there are two PTRS ports and three antenna groups, where the PTRS port 1 corresponds to the antenna group 1, and the PTRS port 2 corresponds to the antenna group 2 and the antenna group 3, so the transmitter can transmit PTRS1 to the receiver over the antenna group 1 corresponding to the PTRS port 1, and transmit PTRS2 to the receiver over the antenna group 2 and the antenna group 3 corresponding to the PTRS port 2.

In the step 207, the receiver receives each PTRS in the OFDM symbol including the PTRS, performs second channel estimation respectively based upon each received PTRS, and obtains a corresponding second channel estimation result of each PTRS.

Specifically the receiver receives each PTRS transmitted by the transmitter in the OFDM symbol including the PTRS over one or more antenna groups corresponding to the each PTRS port, performs second channel estimation respectively based upon each received PTRS, and obtains the corresponding second channel estimation result of each PTRS.

In the example of the previous step above again, the receiver receives two PTRSs, which are PTRS1 and PTRS2 respectively, and the receiver performs second channel estimation respectively on PTRS1 and PTRS2, and obtains a second channel estimation result 1 of PTRS1, and a second channel estimation result 2 of PTRS2.

In the step 208, the receiver determines the first mapping relationship, and uses the second channel estimation result of each PTRS obtained in the OFDM symbol including the PTRS and the first channel estimation result of each DMRS obtained in the OFDM symbol including the DMRS together with the first mapping relationship to calculate a phase change, in the OFDM symbol including the PTRS, arising from phase noise of the antenna group or groups corresponding to each PTRS port respectively.

Specifically the receiver determines the first mapping relationship, where the first mapping relationship represents a correspondence relationship between each PTRS port and each DMRS port, one PTRS port corresponds to at least one DMRS port, and the PTRS port and its corresponding DMRS port(s) uses the same antenna port group(s) for transmission.

Furthermore the first mapping relationship is determined and then transmitted by the transmitter to the receiver, or can be pre-agreed between the receiver and the transmitter, where the transmitter can transmit the first mapping relationship to the receiver via higher-layer signaling or dynamic control signaling.

Still furthermore after the first mapping relationship is determined, the receiver uses the second channel estimation result of each PTRS obtained in the OFDM symbol including the PTRS, and the first channel estimation result of each DMRS obtained in the OFDM symbol including the DMRS to calculate the phase change, in the OFDM symbol including the PTRS, arising from phase noise of the antenna group or groups corresponding to each PTRS port respectively.

For example, all the DMRSs are transmitted in the third OFDM symbol in a sub-frame, and all the PTRSs are transmitted in the fourth OFDM symbol; and the PTRS port 1 corresponds to the DMRS port 1, and corresponds to the antenna group 1, and the PTRS port 2 corresponds to the DMRS port 2, and corresponds to the antenna group 2. With the second channel estimation result 1 of PTRS1 obtained in the fourth OFDM symbol, and the first channel estimation result 1 of DMRS1 obtained in the third OFDM symbol, a phase change 1, in the fourth OFDM symbol, arising from phase noise of the antenna group 1 corresponding to the PTRS port 1, and a phase change 2, in the fourth OFDM symbol, arising from phase noise of the antenna group 2 corresponding to the PTRS port 2 are calculated.

In the step 209, the transmitter pre-codes each data streams to be transmitted, and transmits each data stream to the receiver over its corresponding antenna groups.

Specifically the transmitter pre-codes each data stream to be transmitted, before it transmits the data stream to the receiver, where the transmitter pre-codes a data stream in such a way that weights for antenna elements or antenna ports in the other antenna groups than an antenna group corresponding to the data stream are zero. Precoder thereof can be fed back by the receiver, or can be determined by the transmitter according to uplink and downlink reciprocity.

Still furthermore the transmitter transmits the respective data streams to the receiver respectively over their corresponding one or more antenna groups after pre-coding each data stream.

In the step 210, the receiver receives data streams transmitted by the transmitter, determines the second mapping relationship, compensates for the first channel estimation result obtained for each DMRS port, using the phase change, in the OFDM symbol including the PTRS, of the antenna group corresponding to the DMRS port, for the data stream in the OFDM symbol including the PTRS, and demodulates the data streams using the compensated first channel estimation results based upon the second mapping relationship.

Specifically the receiver determines the second mapping relationships, where each second mapping relationship represents a correspondence relationship between each data stream and each DMRS port, where one data stream corresponds to one DMRS port, and the data stream and its corresponding DMRS port corresponds to the same antenna group for transmission.

Furthermore the second mapping relationship is determined and then transmitted by the transmitter to the receiver, or can be pre-agreed between the receiver and the transmitter, where the transmitter can transmit the second mapping relationship to the receiver via higher-layer signaling or dynamic control signaling.

Still furthermore the receiver receives each data stream transmitted by the transmitter respectively over the antenna group corresponding to the data stream.

The receiver determines the first channel estimation result estimated on the DMRS port corresponding to each data stream, and then compensates for the first channel estimation result using the phase change arising from phase noise of the antenna group(s) corresponding to the DMRS port.

The receiver demodulates the data streams using the compensated first channel estimation results based upon the second mapping relationship.

Of course, in the embodiment of the invention, the transmitter transmits reference signals (e.g., PTRSs, DMRSs, etc.) and data streams in no chronological order, and the transmitter may transmit PTRSs, DMRSs, and data streams at the same time; and correspondingly the receiver receives the reference signals or the data streams in no chronological order. They have been transmitted in the respective steps in the embodiment above only for the sake of a convenient description, and a repeated description thereof will be omitted here.

In the embodiment above, each data stream may be subjected to phase noise in each OFDM symbol in a sub-frame, so a channel estimation result in the OFDM symbol including a DMRS cannot be used directly for demodulating data streams in the other OFDM symbols. It is thus necessary to compensate for the channel estimation result in the OFDM symbol including the DMRS based upon a phase change, arising from estimated phase noise, in an OFDM symbol including each PTRS, and to demodulate the data stream received in the corresponding OFDM symbol using the compensated channel estimation result.

Take one OFDM symbol for example, the embodiment of the invention will be further described below combined with specific implementation scenarios.

In a First Scenario:

For example, there are two data streams to be transmitted, that is, R=2, there are N number of antennas (antenna elements or antenna ports) in the transmitter, where the antennas are grouped into two groups according to phase noise, that is, S=2, and there is the same phase noise in the same antenna group, where the first N1 number of antennas are a group, and the last (N-N1) number of antennas are a group.

Furthermore, given that there are two PTRS ports, that is, M=2, then there are two DMRS ports due to the one-to-one correspondence relationship between the data stream and the DMRS port, and given that one DMRS port corresponds to one antenna group.

Figure 3:
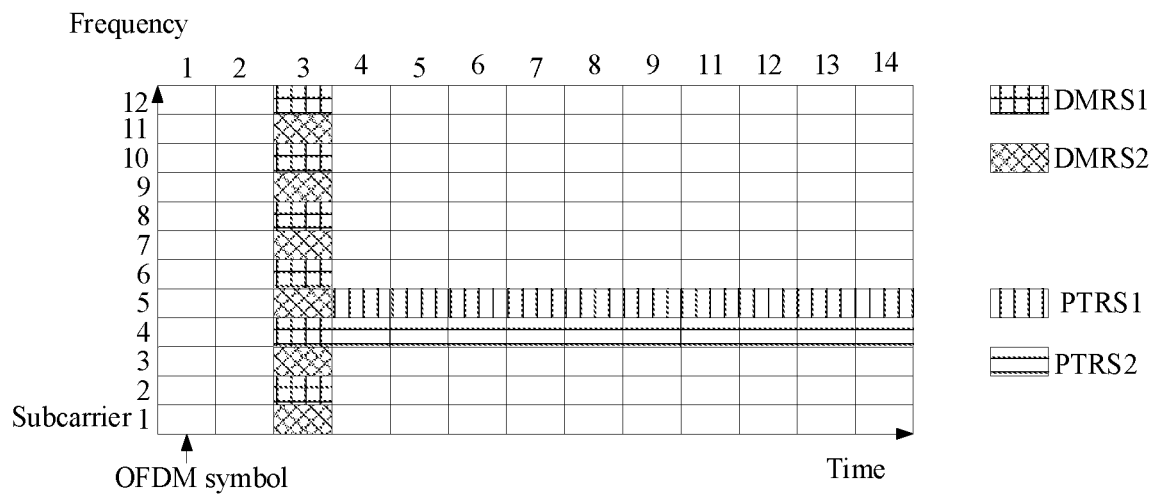
FIG. 3 illustrates a schematic diagram of a sub-frame configuration of reference signals according to a first embodiment of the invention.

Further given that a sub-frame configuration of reference signals (including PTRSs and DMRSs) is illustrated in FIG. 3, where one sub-frame includes 14 OFDM symbols and 12 sub-carriers; and the abscissa represents the time domain, and the ordinate represents the frequency domain.

Furthermore DMRSs are located in the third OFDM symbol, and DMRSs in an OFDM symbol are transmitted via two DMRS ports in a frequency-division multiplexing mode; and one PTRS occupies one sub-carrier, the PTRS port 1 is configured on the fifth sub-carrier, and the PTRS port 2 is configured on the fourth sub-carrier, where PTRSs are transmitted consecutively in the fourth OFDM symbol to the fourteenth OFDM symbol, where in the sub-frame above, the first OFDM symbol to the second OFDM symbol are control channels, and the remaining blank OFDM symbols are transmission channels of data streams.

The transmitter (e.g., a base station) operates as follows.

Figure 4:
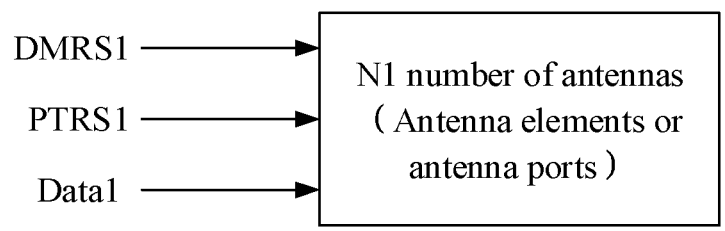
FIG. 4 illustrates a schematic diagram of a transmission scheme of reference signals according to the first embodiment of the invention.
Figure 4:
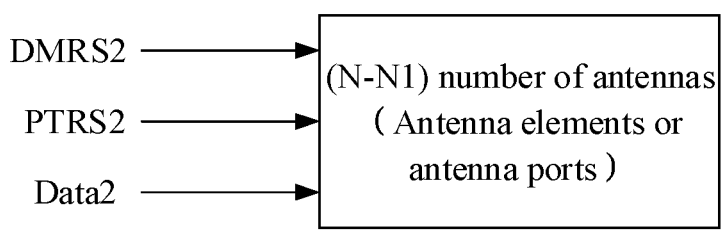

For example, the first data stream to be transmitted is transmitted over the first N1 number of antennas in the transmitter, and the second data stream to be transmitted is transmitted over the last (N-N1) number of antennas in the transmitter, specifically as illustrated in FIG. 4.

Taking the k-th sub-carrier as an example, preferably a pre-coding matrix for transmitting the data streams can be determined in the equation of:

$$W^k = [w_1^k \ w_2^k] = \begin{bmatrix} w_{1,1}^k & 0 \\ 0 & w_{2,2}^k \end{bmatrix}.$$

Where $w_{1,1}^k$ is a $N_1 \times 1$ column vector corresponding to weights for the first N1 number of antennas in precoder used by the first data stream.

$w_{2,2}^k$ is a $(N-N_1) \times 1$ column vector corresponding to weights for the last (N-N1) number of antennas in precoder used by the second data stream.

Furthermore as illustrated in FIG. 4, the DMRS port 1 corresponds to the first N1 number of antennas in the transmitter, and DMRS1 is transmitted on the first N1 number of antennas in the transmitter; and combined with FIG. 3, DMRS1 is distributed on a sub-carrier d1=2, 4, 6, 8, 10, 12, and the precoder used when the transmitter pre-coding DMRS1 on the sub-carrier d1 is the same as the precoder $$w_1^{d_1} = \begin{bmatrix} w_{1,1}^{d_1} \\ 0 \end{bmatrix}$$

corresponding to the first data stream transmitted on the sub-carrier.

Correspondingly the DMRS port 2 corresponds to the last (N-N1) number of antennas in the transmitter, DMRS2 is transmitted on the last (N-N1) number of antennas in the transmitter, and distributed on a sub-carrier d2=1, 3, 5, 7, 9, 11, and precoder used when the transmitter pre-coding DMRS2 on the sub-carrier d2 is the same as precoder $$w_2^{d_2} = \begin{bmatrix} 0 \\ w_{2,2}^{d_2} \end{bmatrix}$$

corresponding to the second data stream transmitted on the sub-carrier.

The two PTRS ports are used for estimating phase noise of their corresponding antenna groups, where the pre-coding is performed on the PTRS port 1 using $$w_1^5 = \begin{bmatrix} w_{1,1}^5 \\ 0 \end{bmatrix},$$

and the pre-coding is performed on the PTRS port 2 using $$w_2^4 = \begin{bmatrix} 0 \\ w_{2,2}^4 \end{bmatrix}.$$

The transmitter notifies the receiver of the first mapping relationship between the PTRS port 1 and the DMRS port 1, and between the PTRS port 2 to the DMRS port 2 via higher-layer signaling or dynamic control signaling. Also the transmitter notifies the receiver of the second mapping relationship between the first data stream and the DMRS port 1, and between the second data stream and the DMRS port 2 via higher-layer signaling or dynamic control signaling.

Of course, the transmitter can alternatively pre-agree with the receiver on the first mapping relationship and the second mapping relationship instead of notifying the receiver via higher-layer signaling or dynamic control signaling.

The receiver (e.g., a user equipment) operates as follows.

Correspondingly for the receiver, there is different phase noises of antennas in different antenna groups, and preferably a data stream received on the k-th sub-carrier of the l-th OFDM symbol can be determined in the equation of:

$$Y_{k,l} = P_{k,l}^r \cdot H_{k,l} \cdot P_{k,l}^t \cdot W_{k,l} \cdot X_{k,l}$$

Where $Y_{k,l}$ represents a received signal which is a $N_r \times 1$ column vector, where $N_r$ represents the number of receiving antenna ports; $P_{k,l}^r$ represents phase noises at the receiver, and is a $N_r \times N_r$ diagonal matrix, where each element in $P_{k,l}^r$ represents a phase noise on a receiving antenna port; $H_{k,l}$ represents a $N_r \times N_t$ channel matrix, where each element in $H_{k,l}$ represents a channel from an antenna port of the transmitter to an antenna port of the receiver, and $N_t$ represents the number of transmitting antenna ports; $P_{k,l}^t$ represents noise phases at the transmitter, and is a $N_t \times N_t$ diagonal matrix, where each element in $P_{k,l}^t$ represents a phase noise on a transmitting antenna port; $W_{k,l}$ represents a $N_t \times N_s$ pre-code matrix; and $X_{k,l}$ represents a transmission signal, and is a $N_s \times 1$ column vector representing concurrent transmission of $N_s$ data streams.

Furthermore the above equation can be specifically written in correspondence to the transmitter as:

$$\begin{bmatrix} y_1^{k,l} \\ y_2^{k,l} \end{bmatrix} = \begin{bmatrix} e^{j\phi_l^0} & 0 \\ 0 & e^{j\phi_l^1} \end{bmatrix}_{2\times 2} \cdot \begin{bmatrix} H_{1,1}^k & H_{1,2}^k \\ H_{2,1}^k & H_{2,2}^k \end{bmatrix}_{2\times N} \cdot$$

$$\begin{bmatrix} e^{j\theta_l^0} & & & & 0 \\ & \ddots & & & \\ & & e^{j\theta_l^0} & & \\ & & & e^{j\theta_l^1} & \\ & & & & \ddots \\ 0 & & & & e^{j\theta_l^1} \end{bmatrix}_{N \times N} \cdot \begin{bmatrix} w_{1,1}^k & 0 \\ 0 & w_{2,2}^k \end{bmatrix}_{N \times 2} \cdot \begin{bmatrix} x_1^{k,l} \\ x_2^{k,l} \end{bmatrix}_{2 \times 1}.$$

Where a channel and a precoder in a sub-frame are not changed, that is, a channel matrix $H_{k,l}$ and a pre-coding matrix $W_{k,l}$ are not changed, and there are N1 elements of $e^{j\theta_l^0}$, and (N−N1) elements of $e^{j\theta_l^1}$, on the diagonal of a phase noise matrix of the transmitter.

The receiver receives the DMRSs in the third OFDM symbol, and take the first receiving antenna for example, the receiver performs channel estimation using received DMRS1 via the DMRS port 1, and obtains a channel estimation result $e^{j\Phi_3^0} \cdot H_{1,1}^k \cdot e^{j\Theta_3^0} \cdot w_{1,1}^k$; and performs channel estimation using received DMRS2 via the DMRS port 2, and obtains a channel estimation result $e^{j\Phi_3^0} \cdot H_{1,2}^k \cdot e^{j\Theta_3^0} \cdot w_{2,2}^k$.

The receiver can perform channel estimation on channels of all the sub-carriers through channel interpolation in the third OFDM symbol including the DMRS, where k=1, 2, . . . , 12 for the sub-carriers as illustrated in FIG. 3.

The receiver receives the PTRSs transmitted in two PTRS ports starting with the fourth OFDM symbol, performs channel estimation using received PTRS1 via the PTRS port 1, and obtains a channel estimation result $e^{j\Phi_l^0} \cdot H_{1,1}^5 \cdot e^{j\Theta_l^0} \cdot w_{1,1}^5$, and performs channel estimation using received PTRS2 via the PTRS port 2, and obtains a channel estimation result $e^{j\Phi_l^0} \cdot H_{1,2}^4 \cdot e^{j\Theta_l^1} \cdot w_{2,2}^4$, where l≥4.

The receiver receives the first mapping relationship notified by the transmitter via the higher-layer signaling or the dynamic control signaling, or the receiver pre-agrees the first mapping relationship with the transmitter, where in the first mapping relationship, the PTRS port 1 corresponds to the DMRS port 1, and the PTRS port 2 corresponds to the DMRS port 2.

The receiver divides the channel estimation result obtained by performing channel estimation using PTRS1, by the channel estimation result obtained by performing channel estimation using DMRS1, based upon the first mapping relationship, and determines a phase change, by the l-th OFDM symbol relative to the third OFDM symbol on the first receiving antenna, corresponding to the antennas in the first antenna group of the transmitter where preferably the phase change can be represented in the equation of:

$$e^{j\Phi_l^0} = \frac{e^{j\phi_l^0} \cdot H_{1,1}^5 \cdot e^{j\theta_l^0} \cdot w_{1,1}^5}{e^{j\phi_3^0} \cdot H_{1,1}^5 \cdot e^{j\theta_3^0} \cdot w_{1,1}^5}.$$

And the receiver divides the channel estimation result obtained by performing channel estimation using PTRS2, by the channel estimation result obtained by performing channel estimation using DMRS2, based upon the first mapping relationship, and determines a phase change experienced by the l-th OFDM symbol on the first receiving antenna relative to the antennas in the second antenna group corresponding to the transmitter of the third OFDM symbol, where preferably the phase change can be represented in the equation of:

$$e^{j\Phi_l^0} = \frac{e^{j\phi_l^0} \cdot H_{1,2}^4 \cdot e^{j\theta_l^1} \cdot w_{2,2}^4}{e^{j\phi_3^0} \cdot H_{1,2}^4 \cdot e^{j\theta_3^1} \cdot w_{2,2}^4}.$$

In this way, channel estimation results on the k-th sub-carrier in the l-th OFDM symbol on the first receiving antenna can be obtained as $e^{j\Phi_3^0} \cdot H_{1,1}^k \cdot e^{j\Theta_3^0} \cdot w_{1,1}^k \cdot e^{j\Phi_l^0}$ and $e^{j\Phi_3^0} \cdot H_{1,2}^k \cdot e^{j\Theta_3^1} \cdot w_{2,2}^k \cdot e^{j\Phi_l^0}$.

Alike, channel estimation results on the k-th sub-carrier in the l-th OFDM symbol on the second receiving antenna can be obtained.

The receiver receives the second mapping relationship notified by the transmitter via the higher-layer signaling or the dynamic control signaling, or the second mapping relationship is pre-agreed between the receiver and the transmitter, where the second mapping relationship, is a one-to-one correspondence between data streams and DMRS ports; and the receiver demodulates the data stream according to the second mapping relationship, and the compensated channel estimation result of each antenna.

Alike the process can be performed for the other sub-carriers, and a repeated description thereof will be omitted here.

In a Second Scenario:

For example, there are three data streams to be transmitted, that is, R=3, there are N number of antennas (antenna elements or antenna ports) in the transmitter, where the antennas are grouped into two groups according to their phase noise, that is, S=2, and the same antenna group has the same phase noise, where the first N1 number of antennas are in one group, and the last (N−N1) number of antennas are in another group.

Furthermore, for example, there are two PTRS ports, that is, M=2, and there are three DMRS ports.

Figure 5:
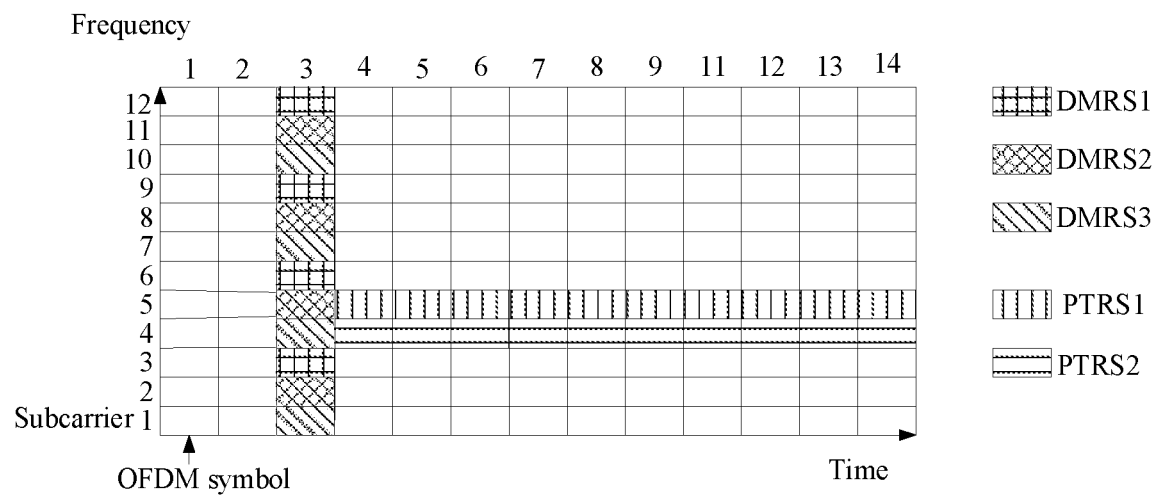
FIG. 5 illustrates a schematic diagram of a sub-frame configuration of reference signals according to a second embodiment of the invention.

For example, FIG. 5 illustrates a sub-frame configuration of reference signals (including PTRSs and DMRSs), where there are 14 OFDM symbols and 12 sub-carriers in total in a sub-frame; and the abscissa represents the time domain, and the ordinate represents the frequency domain.

Furthermore DMRSs are located in the third OFDM symbol, and DMRSs in an OFDM symbol are transmitted via three DMRS ports in a frequency-division multiplexing mode; and one PTRS occupies one sub-carrier, the PTRS port 1 is configured on the fifth sub-carrier, and the PTRS port 2 is configured on the fourth sub-carrier, where PTRSs are transmitted consecutively in the fourth OFDM symbol to the fourteenth OFDM symbol, where the first OFDM symbol to the second OFDM symbol are control channels, and the remaining blank OFDM symbols are transmission channels of data streams, in the sub-frame above.

The transmitter (e.g., a base station) operates as follows.

Figure 6:
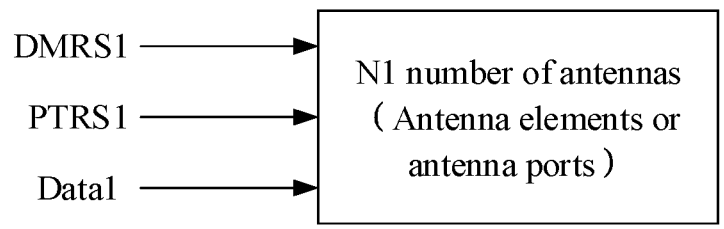
FIG. 6 illustrates a schematic diagram of a transmission scheme of the reference signals according to the second embodiment of the invention.
Figure 6:
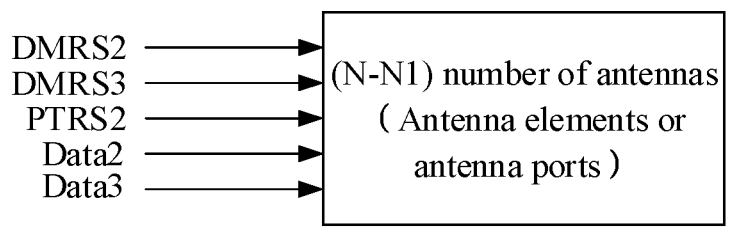

For example, the first data stream to be transmitted is transmitted on the first N1 number of antennas in the transmitter, and the second data stream to be transmitted is transmitted on the last (N-N1) number of antennas of the transmitter, specifically as illustrated in FIG. 6.

Taking the k-th sub-carrier as an example, preferably a pre-coding matrix for transmitting the data streams can be determined in the equation of:

$$W^k = [w_1^k \ w_2^k \ w_3^k] = \begin{bmatrix} w_{1,1}^k & 0 & 0 \\ 0 & w_{2,2}^k & w_{3,2}^k \end{bmatrix}.$$

Where $w_{1,1}^k$ is a $N_1 \times 1$ column vector corresponding to weights for the first N1 number of antennas in precoder used by the first data stream.

$w_{2,2}^k$ and $w_{3,2}^k$ are $(N-N_1) \times 1$ column vectors corresponding to weights for the last (N-N1) number of antennas in precoder used by the second data stream and the third data stream respectively.

Furthermore as illustrated in FIG. 6, the DMRS port 1 corresponds to the first N1 number of antennas in the transmitter, and DMRS1 is transmitted on the first N1 number of antennas in the transmitter; and as illustrated in FIG. 5, DMRS1 is distributed on a sub-carrier d1=3, 6, 9, 12, and precoder used when the transmitter pre-coding DMRS1 on the sub-carrier d1 is the same as precoder $$w_1^{d_1} = \begin{bmatrix} w_{1,1}^{d_1} \\ 0 \end{bmatrix}$$

corresponding to the first data stream transmitted on the sub-carrier.

Correspondingly the DMRS port 2 corresponds to the last (N-N1) number of antennas in the transmitter, DMRS2 is transmitted on the last (N-N1) antennas in the transmitter, and distributed on a sub-carrier d2=2, 5, 8, 11. For the DMRS2 on sub-carrier d2, precoder used when the transmitter pre-codes DMRS2 is the same as precoder $$w_2^{d_2} = \begin{bmatrix} 0 \\ w_{2,2}^{d_2} \end{bmatrix}$$

corresponding to the second data stream transmitted on the sub-carrier d2.

Correspondingly the DMRS port 3 also corresponds to the last (N-N1) number of antennas in the transmitter, DMRS3 is transmitted on the last (N-N1) number of antennas in the transmitter, and distributed on a sub-carrier d3=1, 4, 7, 10. For the DMRS3 on sub-carrier d3, precoder used when the transmitter pre-codes DMRS3 is the same as precoder $$w_3^{d_3} = \begin{bmatrix} 0 \\ w_{3,2}^{d_3} \end{bmatrix}$$

corresponding to the third data stream transmitted over the sub-carrier d3.

The two PTRS ports are used for estimating phase noise of their corresponding antenna groups, where the pre-coding is performed on the PTRS port 1 using $$w_1^5 = \begin{bmatrix} w_{1,1}^5 \\ 0 \end{bmatrix},$$

and the PTRS port 2 is pre-coded using $$w_2^4 + w_3^4 = \begin{bmatrix} 0 \\ w_{2,2}^4 + w_{3,2}^4 \end{bmatrix}.$$

The transmitter notifies the receiver of the first mapping relationship between the PTRS port 1 and the DMRS port 1, and between the PTRS port 2 to the DMRS port 2 via higher-layer signaling or dynamic control signaling. Also the transmitter notifies the receiver of the second mapping relationship between the first data stream and the DMRS port 1, between the second data stream and the DMRS port 2, and between the third data stream and the DMRS port 3 via higher-layer signaling or dynamic control signaling.

Of course, the transmitter can alternatively pre-agree with the receiver on the first mapping relationship and the second mapping relationship instead of notifying the receiver via higher-layer signaling or dynamic control signaling.

The receiver (e.g., a user equipment) operates as follows.

Correspondingly for the receiver, there is different phase noises of antennas in different antenna groups, and preferably a data stream received on the k-th sub-carrier of the l-th OFDM symbol can be determined in the equation of:

$$Y_{k,l} = P_{k,l}^r \cdot H_{k,l} \cdot P_{k,l}^t \cdot W_{k,l} \cdot X_{k,l}.$$

Where $Y_{k,l}$ represents a received signal which is a $N_r \times 1$ column vector, where $N_r$ represents the number of receiving antenna ports; $P_{k,l}^r$ represents phase noises at the receiver, and is a $N_r \times N_r$ diagonal matrix, where each element in $P_{k,l}^r$ represents a phase noise on a receiving antenna port; $H_{k,l}$ represents a $N_r \times N_t$ channel matrix, where each element in $H_{k,l}$ represents a channel from an antenna port of the transmitter to an antenna port of the receiver, and $N_t$ represents the number of transmitting antenna ports; $P_{k,l}^t$ represents noise phases at the transmitter, and is a $N_t \times N_t$ diagonal matrix, where each element in $P_{k,l}^t$ represents a phase noise on a transmitting antenna port; $W_{k,l}$ represents a $N_t \times N_s$ pre-code matrix; and $X_{k,l}$ represents a transmission signal, and is a $N_s \times 1$ column vector representing concurrent transmission of $N_s$ data streams.

Furthermore the above equation can be specifically written in correspondence to the transmitter as:

$$\begin{bmatrix} y_1^{k,l} \\ y_2^{k,l} \\ y_3^{k,l} \\ y_4^{k,l} \end{bmatrix} = \begin{bmatrix} e^{j\phi_l^0} & & & \\ & e^{j\phi_l^1} & & \\ & & e^{j\phi_l^2} & \\ & & & e^{j\phi_l^3} \end{bmatrix}_{4\times 4} \cdot \begin{bmatrix} H_{1,1}^k & H_{1,2}^k \\ H_{2,1}^k & H_{2,2}^k \\ H_{3,1}^k & H_{3,2}^k \\ H_{4,1}^k & H_{4,2}^k \end{bmatrix}_{4\times N} \cdot$$

$$\begin{bmatrix} e^{j\theta_l^0} & & & & 0 \\ & \ddots & & & \\ & & e^{j\theta_l^0} & & \\ & & & e^{j\theta_l^1} & \\ & & & & \ddots \\ 0 & & & & e^{j\theta_l^1} \end{bmatrix}_{N\times N} \cdot \begin{bmatrix} w_{1,1}^k & 0 & 0 \\ 0 & w_{2,2}^k & w_{3,2}^k \end{bmatrix}_{N\times 3} \cdot \begin{bmatrix} x_1^{k,l} \\ x_2^{k,l} \\ x_3^{k,l} \end{bmatrix}_{3\times 1}$$

Where a channel and a precoder in a sub-frame is not changed, that is, a channel matrix $H_{k,l}$ and a pre-coding matrix $W_{k,l}$ are not changed, and there are N1 elements of $e^{j\theta_l^0}$, and (N-N1) elements of $e^{j\theta_l^1}$, on the diagonal of a phase noise matrix of the transmitter.

The receiver receives the DMRSs in the third OFDM symbol, and taking the second receiving antenna as an example, the receiver performs channel estimation using received DMRS1 via the DMRS port 1, and obtains a channel estimation result $e^{j\Phi_3^1} \cdot H_{2,1}^k \cdot e^{j\Theta_3^0} \cdot w_{1,1}^k$; performs channel estimation using received DMRS2 via the DMRS port 2, and obtains a channel estimation result $e^{j\Phi_3^1} \cdot H_{2,2}^k \cdot e^{j\Theta_3^1} \cdot w_{2,2}^k$; and performs channel estimation using received DMRS3 via the DMRS port 3, and obtains a channel estimation result $e^{j\Phi_3^1} \cdot H_{2,2}^k \cdot e^{j\Theta_3^1} \cdot w_{3,2}^k$.

The receiver can perform channel estimation on channels of all the sub-carriers through channel interpolation in the third OFDM symbol including the DMRSs, where k=1, 2, . . . , 12 for the sub-carriers as illustrated in FIG. 5.

The receiver receives the PTRSs transmitted in two PTRS ports starting with the fourth OFDM symbol, performs channel estimation using received PTRS1 via the PTRS port 1, and obtains a channel estimation result $e^{j\phi_l^1} \cdot H_{2,1}^5 \cdot e^{j\theta_l^0} \cdot w_{1,1}^5$, and performs channel estimation using received PTRS2 via the PTRS port 2, and obtains a channel estimation result $(e^{j\Phi_l^1} \cdot H_{2,2}^4 \cdot e^{j\Theta_l^1} \cdot w_{2,2}^4 + e^{j\Phi_l^1} \cdot H_{2,2}^4 \cdot e^{j\Theta_l^1} \cdot w_{3,2}^4)$, where l≥4.

The receiver receives the first mapping relationship notified by the transmitter via the higher-layer signaling or the dynamic control signaling, or the first mapping relationships is pre-agreed between the receiver and the transmitter, where in the first mapping relationship, the PTRS port 1 corresponds to the DMRS port 1, and the PTRS port 2 corresponds to the DMRS port 2 and the DMRS port 3.

The receiver divides the channel estimation result obtained by performing channel estimation using PTRS1, by the channel estimation result obtained by performing channel estimation using DMRS1, based upon the first mapping relationship, and determines a phase change experienced by the l-th OFDM symbol over the second receiving antenna relative to the antennas in the first antenna group corresponding to the transmitter of the third OFDM symbol, where preferably the phase change can be represented in the equation of:

$$e^{j\Phi_l^0} = \frac{e^{j\phi_l^1} \cdot H_{2,1}^5 \cdot e^{j\theta_l^0} \cdot w_{1,1}^5}{e^{j\phi_3^1} \cdot H_{2,1}^5 \cdot e^{j\theta_3^0} \cdot w_{1,1}^5}.$$

The receiver divides the channel estimation result obtained by performing channel estimation using PTRS2, by the channel estimation result obtained by performing channel estimation using DMRS2, based upon the first mapping relationship, and determines a phase change experienced by the l-th OFDM symbol over the second receiving antenna relative to the antennas in the second antenna group corresponding to the transmitter of the third OFDM symbol, where preferably the phase change can be represented in the equation of:

$$e^{j\Phi_l^1} = \frac{e^{j\phi_l^1} \cdot H_{2,2}^4 \cdot e^{j\theta_l^1} \cdot w_{2,2}^4 + e^{j\phi_l^1} \cdot H_{2,2}^4 \cdot e^{j\theta_l^1} \cdot w_{3,2}^4}{e^{j\phi_3^1} \cdot H_{2,2}^4 \cdot e^{j\theta_3^1} \cdot w_{2,2}^4 + e^{j\phi_3^1} \cdot H_{2,2}^4 \cdot e^{j\theta_3^1} \cdot w_{3,2}^4}.$$

In this way, channel estimation results on the k-th sub-carrier in the l-th OFDM symbol on the second receiving antenna can be obtained as $e^{j\Phi_3^1} \cdot H_{2,1}^k \cdot e^{j\Theta_3^0} \cdot w_{1,1}^k \cdot e^{j\Phi_l^0}$, $e^{j\Phi_3^1} \cdot H_{2,2}^k \cdot e^{j\Theta_3^1} \cdot w_{2,2}^k \cdot e^{j\Phi_l^1}$, and $e^{j\Phi_3^1} \cdot H_{2,2}^k \cdot e^{j\Theta_3^1} \cdot w_{3,2}^k \cdot e^{j\Phi_l^1}$.

Alike, channel estimation results on the k-th sub-carrier in the l-th OFDM symbol on the first, third, and fourth receiving antennas can be obtained.

The receiver receives the second mapping relationship notified by the transmitter via the higher-layer signaling or the dynamic control signaling, or the second mapping relationship is ore-agreed between the receiver and the transmitter, where the second mapping relationship is a one-to-one correspondence between the data streams and DMRS ports; and the receiver demodulates the data stream according to the second mapping relationship, and the compensated channel estimation result of each antenna.

Alike the process can be performed for the other sub-carriers, and a repeated description thereof will be omitted here.

Figure 7:
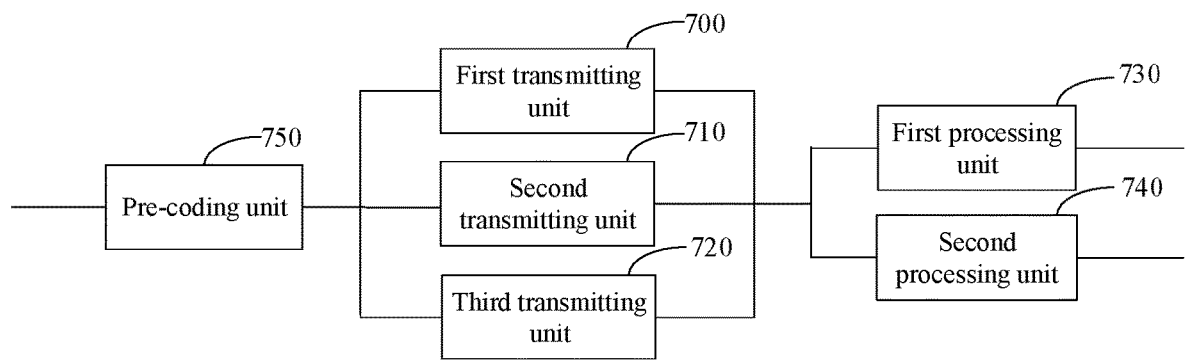
FIG. 7 illustrates a first schematic diagram of a functional structure of an apparatus for transmitting a reference signal according to an embodiment of the invention.

As illustrated in FIG. 7, an apparatus for transmitting a reference signal according to an embodiment of the invention includes a first transmitting unit 700, a second transmitting unit 710, and a third transmitting unit 720.

The first transmitting unit 700 is configured to pre-code each data stream, and then transmit each data stream over one or more antenna groups corresponding to each data stream, where antenna elements or antenna ports in the same antenna group have the same phase noise, and all antenna groups corresponding to one data stream have the same phase noise.

The second transmitting unit 710 is configured to pre-code a Demodulation Reference Signal (DMRS) of each DMRS port, and then transmit each DMRS over corresponding one or more antenna groups, where all antenna groups corresponding to one DMRS port have a same phase noise, and one data stream corresponds to one DMRS port.

The third transmitting unit 730 is configured to pre-code a Phase-Tracking Reference Signal (PTRS) of each PTRS ports, and then transmit each PTRS over corresponding one or more antenna groups, where all antenna groups corresponding to one PTRS port have a same phase noise, and one PTRS port corresponds to at least one PTRS port.

Optionally the apparatus further includes a pre-coding unit 750 configured: to pre-code a data stream in such a way that weights for antenna elements or antenna ports in the other antenna groups than an antenna group corresponding to the data stream are zero; to pre-code a DMRS in such a way that weights for antenna elements or antenna ports in the other antenna groups than an antenna group corresponding to the DMRS are zero; and to pre-code a PTRS in such a way that weights for antenna elements or antenna ports in the other antenna groups than an antenna group corresponding to the PTRS are zero.

Optionally the apparatus further includes a first processing unit 730 configured: to determine a first mapping relationship between the respective PTRS ports and the respective DMRS ports, where in the first mapping relationship, one PTRS port is mapped to at least one DMRS port, and the PTRS port and its mapped DMRS port use a same antenna group for transmission.

Optionally the first processing unit 730 is further configured: to transmit the first mapping relationship to a receiver after determining the first mapping relationship; or to pre-agree with a receiver on the first mapping relationship.

Optionally the first processing unit 730 configured to transmit the first mapping relationship to the receiver is configured: to transmit the first mapping relationship to the receiver via higher-layer signaling; or to transmit the first mapping relationship to the receiver via dynamic control signaling.

Optionally the apparatus further includes a second processing unit 740 configured: to determine a second mapping relationship between the respective data streams to be transmitted, and the respective DMRS ports, where in the second mapping relationship, one data stream is mapped to one DMRS port, and the data stream and its mapped DMRS port correspond to a same antenna group for transmission.

Optionally the second processing unit 740 is further configured: to transmit the second mapping relationship to a receiver after determining the second mapping relationship; or to pre-agree with a receiver on the second mapping relationship.

Optionally the second processing unit 740 configured to transmit the second mapping relationship to the receiver is configured: to transmit the second mapping relationships to the receiver via higher-layer signaling; or to transmit the second mapping relationships to the receiver via dynamic control signaling.

Optionally precoder used by the apparatus for a PTRS is the same as or related to precoder used by a data stream over a sub-carrier occupied by the PTRS, the data stream corresponds to a DMRS port corresponding the PTRS.

Optionally precoder used by the apparatus for a DMRS is the same as or related to precoder used by a data stream over a sub-carrier occupied by the DMRS port, the data stream corresponding to the DMRS port.

Figure 8:
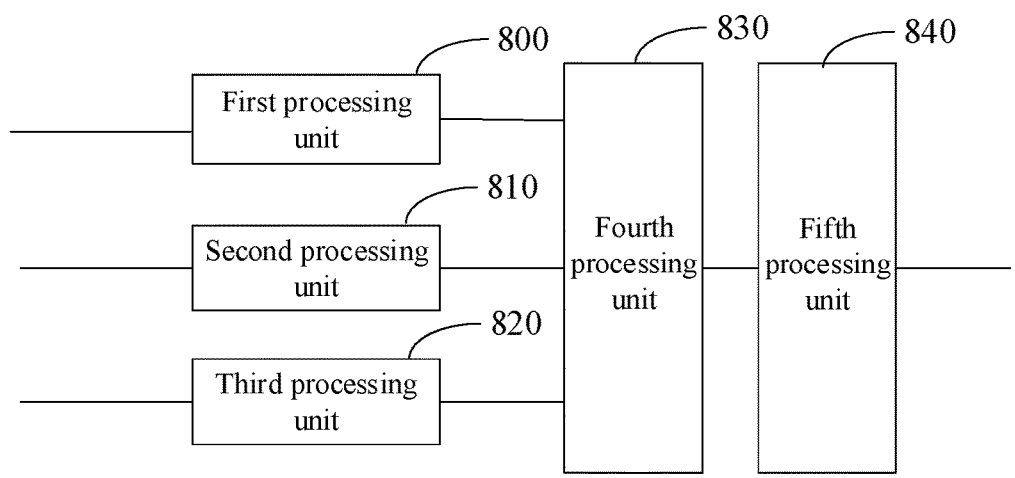
FIG. 8 illustrates a first schematic diagram of a functional structure of an apparatus for determining phase noise according to an embodiment of the invention.

As illustrated in FIG. 8, an apparatus for determining phase noise according to an embodiment of the invention includes a first processing unit 800, a second processing unit 810, a third processing unit 830, and a fourth processing unit 840.

The first processing unit 800 is configured to receive a Demodulation Reference Signal (DMRS) transmitted by a transmitter respectively over one or more antenna groups corresponding to each DMRS port, to perform first channel estimation respectively based upon each received DMRS, and to obtain a corresponding first channel estimation result of each DMRS.

The second processing unit 810 is configured to receive a Phase-Tracking Reference Signal (PTRS) transmitted by the transmitter respectively over one or more antenna groups corresponding to each PTRS port, to perform second channel estimation respectively based upon each received PTRS, and to obtain a corresponding second channel estimation result of each PTRS.

The third processing unit 820 is configured to determine a first mapping relationship, where the first mapping relationship represents a correspondence relationship between the respective PTRS ports and the respective DMRS ports, one PTRS port corresponds to at least one DMRS port, and the PTRS port and its corresponding DMRS port use a same antenna group for transmission.

The fourth processing unit 830 is configured to calculate a phase change, in a symbol including the PTRS, arising from a phase noise of the antenna groups corresponding to each PTRS port respectively using the second channel estimation result of each PTRS and the first channel estimation result of corresponding DMRS based upon the first mapping relationship.

Optionally the first mapping relationship is obtained by the apparatus as notified by the transmitter, or the first mapping relationship is pre-agreed between the apparatus and the transmitter.

Optionally the apparatus further includes a fifth processing unit 840 configured: to receive respective data streams transmitted by the transmitter respectively over their corresponding antenna groups; to determine a second mapping relationship, where the second mapping relationship represents a correspondence relationship between the respective data streams and the respective DMRS ports, one data stream corresponds to one DMRS port, and the data stream and its corresponding DMRS port correspond to a same antenna group for transmission; and to perform the following operations respectively on each data stream based upon the second mapping relationship: determining a first channel estimation result estimated on a DMRS port corresponding to the data stream; compensating for the first channel estimation result using a phase change arising from phase noise of an antenna group corresponding to the DMRS port; and demodulating the data stream using the compensated first channel estimation result.

Optionally the second mapping relationship is obtained by the apparatus as notified by the transmitter, or the second mapping relationship is pre-agreed between the apparatus and the transmitter.

Figure 9:
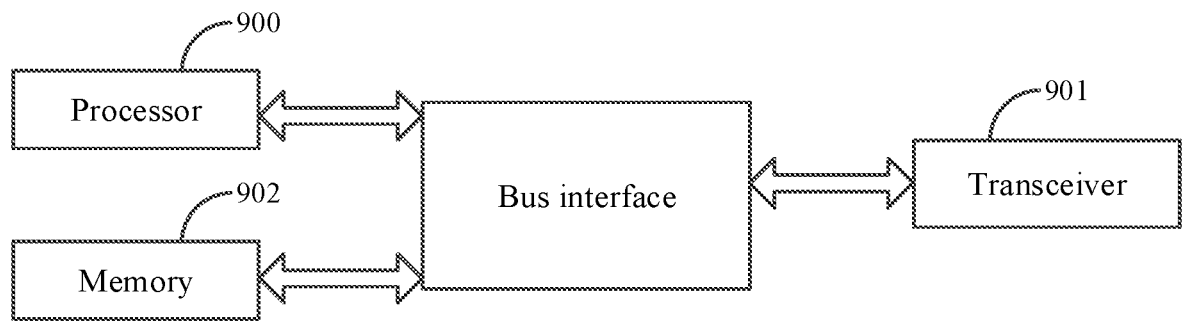
FIG. 9 illustrates a second schematic diagram of a functional structure of an apparatus for transmitting a reference signal according to an embodiment of the invention.

As illustrated in FIG. 9, an apparatus for transmitting a reference signal according to an embodiment of the invention includes a processor 900, a transceiver 901, and a memory 902.

The processor 900 is configured to read and execute program in the memory 902: to transmit data streams, DMRSs, and PTRSs through the transceiver 901; to pre-code each data stream, and then transmit each data stream over corresponding one or more antenna groups, where antenna elements or antenna ports in the same antenna group have the same phase noise, and all antenna groups corresponding to one data stream have the same phase noise; to pre-code a DMRS of each DMRS port, and then transmit each DMRS over corresponding one or more antenna groups, where all antenna groups corresponding to one DMRS port have a same phase noise, and one data stream corresponds to one DMRS port; to pre-code a PTRS of each PTRS port, and then transmit each PTRS over corresponding one or more antenna groups, where all antenna groups corresponding to one PTRS port have a same phase noise, and one PTRS port corresponds to at least one PTRS port.

The transceiver 901 is configured to transmit and receive data under the control of the processor 900.

Optionally the processor 900 is configured: to pre-code a data stream in such a way that weights for antenna elements or antenna ports in the other antenna groups than an antenna group corresponding to the data stream are zero; to pre-code a DMRS in such a way that weights for antenna elements or antenna ports in the other antenna groups than an antenna group corresponding to the DMRS are zero; and to pre-code a PTRS in such a way that weights for antenna elements or antenna ports in the other antenna groups than an antenna group corresponding to the PTRS are zero.

Optionally the processor 900 is configured: to determine a first mapping relationship between the respective PTRS ports and the respective DMRS ports, where in the first mapping relationship, one PTRS port is mapped to at least one DMRS port, and the PTRS port and its mapped DMRS port use a same antenna group for transmission.

Optionally the processor 900 is configured: to transmit the first mapping relationship to a receiver after determining the first mapping relationship; or to pre-agree with a receiver on the first mapping relationship.

Optionally the processor 900 configured to transmit the first mapping relationship to the receiver is configured: to transmit the first mapping relationship to the receiver via higher-layer signaling; or to transmit the first mapping relationship to the receiver via dynamic control signaling.

Optionally the processor 900 is configured: to determine a second mapping relationship between the respective data streams to be transmitted and the respective DMRS ports, where in the second mapping relationship, one data stream is mapped to one DMRS port, and the data stream and its mapped DMRS port correspond to a same antenna group for transmission.

Optionally the processor 900 is configured: to transmit the second mapping relationship to a receiver after determining the second mapping relationships; or to pre-agree with a receiver on the second mapping relationship.

Optionally the processor 900 configured to transmit the second mapping relationship to the receiver is configured: to transmit the second mapping relationship to the receiver via higher-layer signaling; or to transmit the second mapping relationship to the receiver via dynamic control signaling.

Optionally precoder used by the processor 900 for a PTRS is the same as or related to precoder used by a data stream over a sub-carrier occupied by the PTRS, the data stream corresponds to a DMRS port corresponding to the PTRS.

Optionally precoder used by the processor 900 for a DMRS is the same as or related to precoder used by a data stream over a sub-carrier occupied by the DMRS port, the data stream corresponds to the DMRS port.

Here in FIG. 9, the bus architecture can include any number of interconnecting buses and bridges to particularly link together various circuits including one or more processors represented by the processor 900, and one or more memories represented by the memory 920. The bus architecture can further link together various other circuits, e.g., a peripheral device, a manostat, a power management circuit, etc., all of which are well known in the art, so a further description thereof will be omitted in this context. The bus interface serves as an interface. The transceiver 910 can be a number of elements, e.g., a transmitter and a receiver, which are units for communication with various other devices over a transmission medium.

Figure 10:
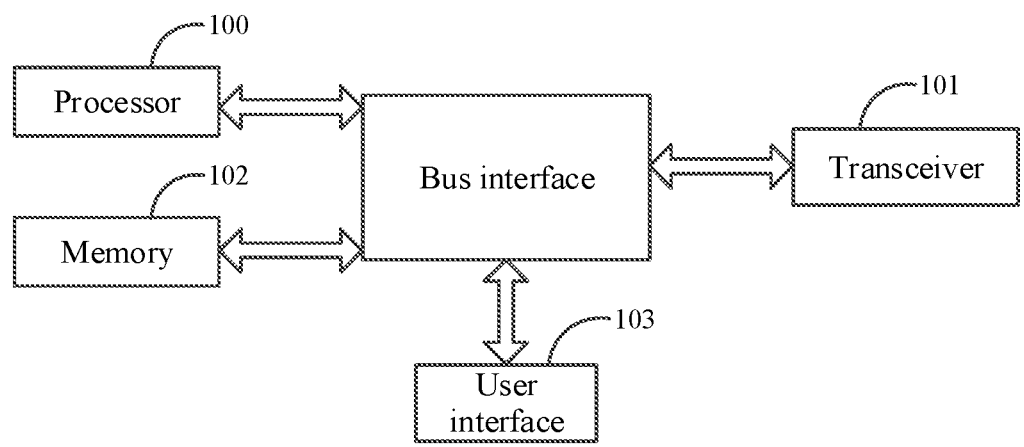
FIG. 10 illustrates a second schematic diagram of a functional structure of an apparatus for determining phase noise according to an embodiment of the invention.

As illustrated in FIG. 10, an apparatus for determining phase noise according to an embodiment of the invention includes a processor 100, a transceiver 101, a memory 102, and a user interface 103.

The processor 100 is configured to read and execute program in the memory 102: to receive data streams, DMRSs, and PTRSs through the transceiver 101; to receive a DMRS transmitted by a transmitter respectively over one or more antenna groups corresponding to each DMRS port, to perform first channel estimation respectively based upon each received DMRS, and to obtain a corresponding first channel estimation result corresponding to each DMRS; to receive a PTRS transmitted by the transmitter respectively over one or more antenna groups corresponding to each PTRS port, to perform second channel estimation respectively based upon each received PTRS, and to obtain a corresponding second channel estimation result corresponding to each PTRS; to determine a first mapping relationship, where the first mapping relationship represents a correspondence relationship between the respective PTRS ports and the respective DMRS ports, one PTRS port corresponds to at least one DMRS port, and the PTRS port and its corresponding DMRS port use a same antenna group for transmission; and to calculate a phase change, in a symbol including the PTRS, arising from a phase noise of the antenna groups corresponding to each PTRS port respectively using the second channel estimation result of each PTRS, and the first channel estimation results of corresponding DMRS based upon the first mapping relationship.

The transceiver 101 is configured to transmit and receive data under the control of the processor 100.

Optionally the first mapping relationship is obtained by the processor 100 as notified by the transmitter, or the first mapping relationship is pre-agreed between the processor 100 and the transmitter.

Optionally the processor 100 is configured: to receive respective data streams transmitted by the transmitter respectively over their corresponding antenna groups; to determine a second mapping relationship, where the second mapping relationship represents a correspondence relationship between the respective data streams and the respective DMRS ports, one data stream corresponds to one DMRS port, and the data stream and its corresponding DMRS port correspond to a same antenna group for transmission; and to perform the following operations respectively on each data stream based upon the second mapping relationship: determining a first channel estimation result estimated on a DMRS port corresponding to the data stream; compensating for the first channel estimation result using a phase change arising from phase noise of an antenna group corresponding to the DMRS port; and demodulating the data stream using the compensated first channel estimation result.

Optionally the second mapping relationship is obtained by the processor 100 as notified by the transmitter, or the second mapping relationship is pre-agreed between the processor 100 and the transmitter.

Here in FIG. 10, the bus architecture can include any number of interconnecting buses and bridges to particularly link together various circuits including one or more processors represented by the processor 100, and one or more memories represented by the memory 102. The bus architecture can further link together various other circuits, e.g., a peripheral device, a manostat, a power management circuit, etc., all of which are well known in the art, so a further description thereof will be omitted in this context. The bus interface serves as an interface. The transceiver 101 can be a number of elements, e.g., a transmitter and a receiver, which are units for communication with various other devices over a transmission medium. For different user equipments, the user interface 103 can also be an interface via which devices are connected internally and externally as needed, and the connected devices include but will not be limited to a keypad, a monitor, a speaker, a microphone, a joystick, etc.

The processor 100 is responsible for managing the bus architecture and performing normal processes, and the memory 102 can store data for use by the processor 100 in performing the operations.

In summary, in the embodiments of the invention, the transmitter transmits respective pre-coded user data streams respectively over their corresponding antenna groups with the same phase noise to the receiver, transmits respective pre-coded DMRSs respectively over their corresponding antenna groups with the same phase noise to the receiver, and transmits respective pre-coded PTRSs respectively over their corresponding antenna groups with the same phase noise to the receiver, where antenna elements or antenna port elements or antenna ports in the same antenna group have the same phase noise. Upon reception of the PTRSs, the receiver performs channel estimation based upon the respective received PTRSs, determines phase changes arising from phase noise corresponding to the different antenna groups, and compensates for channel estimation results of DMRS ports corresponding to the different antenna groups using the phase changes arising from phase noise corresponding to the different antenna groups, and demodulates the data streams transmitted over the corresponding antenna groups using the compensated channel estimation results, so that even if there is different phase noise of the different antennas of the transmitter, then the receiver can determine the phase changes arising from the different phase noise accurately to thereby demodulate all the data transmitted over the different antenna groups accurately according to the different phase changes.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for transmitting a reference signal, comprising:
    pre-coding, by a transmitter, each data stream, and transmitting each data stream over its corresponding one or more antenna groups, wherein antenna elements or antenna ports in a same antenna group have a same phase noise, and all antenna groups corresponding to one data stream have a same phase noise;
    pre-coding, by the transmitter, a Demodulation Reference Signal (DMRS) of each DMRS port, and transmitting each DMRS over its corresponding one or more antenna groups, wherein all antenna groups corresponding to one DMRS port have a same phase noise, and one data stream corresponds to one DMRS port; and
    pre-coding, by the transmitter, a Phase-Tracking Reference Signal (PTRS) of each PTRS port, and transmitting each PTRS over its corresponding one or more antenna groups, wherein all antenna groups corresponding to one PTRS port have a same phase noise, and one PTRS port corresponds to at least one DMRS port.

2. The method according to claim 1, wherein: the transmitter pre-codes a data stream in such a way that weights for antenna elements or antenna ports in the other antenna groups than an antenna group corresponding to the data stream are zero;
    the transmitter pre-codes a DMRS in such a way that weights for antenna elements or antenna ports in the other antenna groups than an antenna group corresponding to the DMRS are zero; and
    the transmitter pre-codes a PTRS in such a way that weights for antenna elements or antenna ports in the other antenna groups than an antenna group corresponding to the PTRS are zero.

3. The method according to claim 1, further comprising:
    determining, by the transmitter, a first mapping relationship between the respective PTRS ports and the respective DMRS ports, wherein in the first mapping relationship, one PTRS port is mapped to at least one DMRS port, and the PTRS port and its mapped DMRS port use a same antenna group for transmission.

4. The method according to claim 3, further comprising:
    transmitting, by the transmitter, the first mapping relationship to a receiver after determining the first mapping relationship; or
    pre-agreeing, by the transmitter, with a receiver on the first mapping relationship;

wherein transmitting, by the transmitter, the first mapping relationship to the receiver comprises:
transmitting, by the transmitter, the first mapping relationship to the receiver via higher-layer signaling; or
transmitting, by the transmitter, the first mapping relationship to the receiver via dynamic control signaling.

5. The method according to claim 1, further comprising:
determining, by the transmitter, a second mapping relationship between the respective data streams to be transmitted and the respective DMRS ports, wherein in the second mapping relationship, one data stream is mapped to one DMRS port, and the data stream and its mapped DMRS port correspond to a same antenna group for transmission.

6. The method according to claim 5, further comprising:
transmitting, by the transmitter, the second mapping relationship to a receiver after determining the second mapping relationship; or
pre-agreeing, by the transmitter, with a receiver on the second mapping relationship;
wherein transmitting, by the transmitter, the second mapping relationship to the receiver comprises:
transmitting, by the transmitter, the second mapping relationship to the receiver via higher-layer signaling; or
transmitting, by the transmitter, the second mapping relationship to the receiver via dynamic control signaling.

7. The method according to claim 1, wherein precoder used by the transmitter for a PTRS is the same as precoder used by a data stream over a sub-carrier occupied by the PTRS, said data stream corresponds to a DMRS port corresponding to the PTRS.

8. An apparatus for transmitting a reference signal, comprising: a processor, a transceiver, and a memory, wherein:
the processor is configured to read and execute program in the memory: to transmit data streams, Demodulation Reference Signals (DMRSs), and Phase-Tracking Reference Signals (PTRSs) through the transceiver; to pre-code each data stream, and then transmit each data stream over its corresponding one or more antenna groups, wherein antenna elements or antenna ports in a same antenna group have a same phase noise, and all antenna groups corresponding to one data stream have a same phase noise; to pre-code a DMRS of each DMRS port, and transmit each DMRS over its corresponding one or more antenna groups, wherein all antenna groups corresponding to one DMRS port have a same phase noise, and one data stream corresponds to one DMRS port; and to pre-code a PTRS of each PTRS port, and transmit each PTRS over its corresponding one or more antenna groups, wherein all antenna groups corresponding to one PTRS port have a same phase noise, and one PTRS port corresponds to at least one DMRS port; and
the transceiver is configured to transmit and receive data under a control of the processor.

9. The apparatus according to claim 8, wherein the processor is configured:
to pre-code a data stream in such a way that weights for antenna elements or antenna ports in the other antenna groups than an antenna group corresponding to the data stream are zero;
to pre-code a DMRS in such a way that weights for antenna elements or antenna ports in the other antenna groups than an antenna group corresponding to the DMRS are zero; and
to pre-code a PTRS in such a way that weights for antenna elements or antenna ports in the other antenna groups than an antenna group corresponding to the PTRS are zero.

10. The apparatus according to claim 8, wherein the processor is configured:
to determine a first mapping relationship between the respective PTRS ports and the respective DMRS ports, wherein in the first mapping relationship, one PTRS port is mapped to at least one DMRS port, and the PTRS port and its mapped DMRS port use a same antenna group for transmission.

11. The apparatus according to claim 10, wherein the processor is configured:
to transmit the first mapping relationship to a receiver after determining the first mapping relationships; or
to pre-agree with a receiver on the first mapping relationship;
wherein the processor configured to transmit the first mapping relationship to the receiver is configured:
to transmit the first mapping relationship to the receiver via higher-layer signaling; or
to transmit the first mapping relationship to the receiver via dynamic control signaling.

12. The apparatus according to claim 8, wherein the processor is configured:
to determine a second mapping relationship between the respective data streams to be transmitted and the respective DMRS ports, wherein in the second mapping relationship, one data stream is mapped to one DMRS port, and the data stream and its mapped DMRS port correspond to a same antenna group for transmission.

13. The apparatus according to claim 12, wherein the processor is configured:
to transmit the second mapping relationship to a receiver after determining the second mapping relationship; or
to pre-agree with a receiver on the second mapping relationship;
wherein the processor configured to transmit the second mapping relationship to the receiver:
to transmit the second mapping relationship to the receiver via higher-layer signaling; or
to transmit the second mapping relationship to the receiver via dynamic control signaling.

14. The apparatus according to claim 8, wherein precoder used by the processor for a PTRS is the same as precoder used by a data stream over a sub-carrier occupied by the PTRS, said data stream corresponds to a DMRS port corresponding to the PTRS.

* * * * *